(12) United States Patent
Kandhasamy Narayanan et al.

(10) Patent No.: US 11,184,228 B2
(45) Date of Patent: Nov. 23, 2021

(54) CONFIGURATION CONTROL FOR NETWORK

(71) Applicant: Telefonaktiebolaget LM Ericsson (publ), Stockholm (SE)

(72) Inventors: Premnath Kandhasamy Narayanan, Westmeath (IE); Jan Groenendijk, Westmeath (IE); Fredrik Gunnarsson, Linköping (SE); Raghavendra Mahalingappa, Westmeath (IE); Johan Schultz, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 240 days.

(21) Appl. No.: 16/463,657

(22) PCT Filed: Dec. 2, 2016

(86) PCT No.: PCT/EP2016/079557
§ 371 (c)(1),
(2) Date: May 23, 2019

(87) PCT Pub. No.: WO2018/099569
PCT Pub. Date: Jun. 7, 2018

(65) Prior Publication Data
US 2021/0119866 A1 Apr. 22, 2021

(51) Int. Cl.
*H04L 12/24* (2006.01)
*H04L 12/46* (2006.01)

(52) U.S. Cl.
CPC ...... *H04L 41/0813* (2013.01); *H04L 12/4641* (2013.01)

(58) Field of Classification Search
CPC ............. H04L 41/0813; H04L 12/4641; G06F 9/45533; G06F 9/5077; G06F 9/541; G06F 11/1482; G06F 11/2025; G06F 2201/815
See application file for complete search history.

(56) References Cited

U.S. PATENT DOCUMENTS

| 9,384,028 B1 | 7/2016 | Felstaine et al. |
| 2015/0092544 A1* | 4/2015 | Pasquale ............... H04W 16/14 370/230 |

(Continued)

FOREIGN PATENT DOCUMENTS

| DK | WO 2016/096033 | * 6/2016 | ............ H04W 36/10 |
| WO | 2016 096033 A1 | 6/2016 | |
| WO | 2016 128030 A1 | 8/2016 | |

OTHER PUBLICATIONS

Riccobene et al., "Automated generation of VNF deployment rules using infrastructure affinity characterization", 2016 IEEE NetSoft Conference and Workshops (NetSoft), Jun. 2016, IEEE Publishing.*

(Continued)

*Primary Examiner* — Todd L Barker
(74) *Attorney, Agent, or Firm* — Baker Botts, LLP

(57) ABSTRACT

A configuration controller (60) is provided to make changes to configuration of a communications network (10) having VNFs used in providing services to UEs. If the change could affect a service using a first VNF (30), if made while that VNF is in use, a substitute VNF (32) is instantiated corresponding to that first VNF. The first UE is transferred to use the substitute VNF instead of the first VNF. The proposed change to the configuration is made with respect to either one of these VNFs, while the service to the first UE is maintained using the other one of these VNFs. If needed all VNFs and a service area can be substituted. Thus, such (Continued)

configuration changes no longer need to await a quiet period when few or no UEs are attached, and enable the configuration changes to be made more rapidly, responsive to changing circumstances.

22 Claims, 18 Drawing Sheets

(56) References Cited

U.S. PATENT DOCUMENTS

| | | |
|---|---|---|
| 2016/0269954 A1 | 9/2016 | Purohit |
| 2017/0048855 A1* | 2/2017 | Garg ..................... H04W 48/16 |
| 2017/0086118 A1* | 3/2017 | Vrzic .................... H04W 36/26 |
| 2017/0139727 A1* | 5/2017 | Combellas ............ H04L 41/082 |
| 2017/0223541 A1* | 8/2017 | Chami ................ H04W 12/084 |
| 2017/0257276 A1* | 9/2017 | Chou ................. H04L 41/0823 |
| 2017/0273108 A1* | 9/2017 | Damnjanovic ..... H04W 74/085 |
| 2018/0042031 A1* | 2/2018 | Hampel ............ H04W 72/1278 |
| 2018/0152507 A1* | 5/2018 | Rosenberg ............. H04L 67/10 |
| 2019/0182841 A1* | 6/2019 | Soldati ................. H04W 76/12 |
| 2019/0281103 A1* | 9/2019 | Singh .................... H04L 43/062 |

OTHER PUBLICATIONS

International Search Report for International application No. PCT/EP2016/079557—dated Aug. 16, 2017.

* cited by examiner

CONFIGURATION CONTROL FOR NETWORK

PRIORITY

This nonprovisional application is a U.S. National Stage Filing under 35 U.S.C. § 371 of International Patent Application Serial No. PCT/EP2016/079557 filed Dec. 2, 2016 and entitled "CONFIGURATION CONTROL FOR NETWORK" which is hereby incorporated by reference in its entirety.

TECHNICAL FIELD

The present disclosure relates generally to methods of making changes to configuration of a service area of a communications network, to corresponding programs for computers, and to corresponding apparatus for controlling such changes in configuration.

BACKGROUND

It is known to provide communications networks such as cellular networks for providing communication services for user equipment, UE, devices. During the operational phase of a cellular network such as a radio access network, RAN, configuration changes are regularly required for problem resolution or network optimization for example. Most of these changes can be implemented without disturbing the connected user equipment devices.

Some configuration parameters have an intrinsic relation with the attached UE's and neighboring cell which makes it more complicated for an operator to change those parameters, for example PCI conflicts or optimization requests. The only way of modifying these parameters is to lock the cell. Cell lock means that all attached UE's are disconnected or are gracefully handed-over to neighbouring cells.

Some configuration parameters in an RBS cannot be changed without hard or soft locking (GSM, WCDMA, LTE) a cell. Some operators perform a hard lock to change the configuration parameters, which disconnects the UE from the network abruptly. The cell hard lock procedure is usually only used at low traffic hours or during a maintenance window so as to reduce the impact on the traffic in the network when locking a cell. Soft-lock is a procedure to power down (not off) a cell after the UE's attached to the cell are gracefully handed-over to another cell.

In cases where there are no overlapping cells it is not possible to hand-over attached UE's to another cell. This is particularly the case in rural areas. The configuration change will last longer and the cell service will be interrupted.

This means that those parameters can only be changed during pre-arranged maintenance windows when there is no traffic or traffic is significantly low. An effect is that network configuration changes due to network faults or network optimization take time before being implemented in the network. Hand-over of traffic from a cell to other cells impacts the network performance, as the total network capacity in the area of the cell decreases because the cell is off line. To avoid having to hand-over too many UE's and impacting the load in other cell the changes are made during low traffic hours (e.g. during night time). This makes the network less efficient during the day before the configuration changes can be made the following night.

SUMMARY

An aspect of this disclosure provides a method of making changes to configuration of a first service area of a communications network having a number of service areas capable of providing at least one service to at least one UE, User Equipment, the network having a plurality of VNFs, Virtual Network Functions, used in providing the services to the UEs according to the configuration. In the case of a proposed change to the configuration which could negatively impact at least one service provided to a first of the UEs using a first of the VNFs, if the change is made while the first VNF is in use, there are steps of instantiating at least one substitute VNF corresponding to the first VNF, and transferring the first UE to use the substitute VNF instead of using the first VNF. The proposed change to the configuration is made with respect to one of these VNFs, the first VNF or the substitute VNF, while the service to the first UE is maintained using the other one of these VNFs.

A consequence of maintaining service by providing such a substitute VNF, is that any configuration changes which could negatively impact the service if made while the first VNF is in use, no longer need to await a quiet period when few or no UEs are having services provided. This can enable the timing of the configuration changes to be controlled, so they can be more rapid or more responsive to changing circumstances such as changes in load or in equipment availability or capacity for example.

Any additional optional features can be added, and some are described below and set out in dependent claims. One such additional feature is a step of implementing the proposed change in the configuration with respect to the substitute VNF before the transfer of the first UE to use the substitute VNF.

Another such additional feature is implementing the proposed change in the configuration with respect to the first VNF after (124) the transfer of the first UE to use the substitute VNF, and subsequently transferring back the first UE to use the first VNF instead of using the substitute VNF. Another such additional feature is the step of instantiating also comprising providing a substitute service area at least partially corresponding to the first service area, and the step of transferring also comprises a hand-over of the first UE to the substitute service area.

Another such additional feature is that providing the substitute service area comprises providing the substitute service area with a configuration and relations to other parts of the network corresponding to those of the first service area. Another such additional feature is, where the first VNF is a part of a first Virtual Network function Group, VNG, of all the VNFs modelled by a VNF forwarding graph defining the service to the first UE, the step of instantiating comprising instantiating a substitute VNG corresponding to the first VNG.

Another such additional feature is identifying which of the VNFs used to provide the service to the first UE are affected by the proposed change in configuration, and selecting which VNFs to substitute based on those identified as being affected.

Another such additional feature is, where the first VNF comprises virtualised parts and physical network resources, the step of instantiating the substitute VNF comprising allocating physical network resources for use by the substitute VNF.

Other such additional features are: determining if there is sufficient capacity to allocate the physical network resources for use by the substitute VNF without affecting other UEs, load balancing between the first service area and other service areas of the communications network to try to make more capacity available for allocating, reducing capacity allocated to other UEs, to provide more capacity for the substitute VNF, carrying out load balancing between different access network technologies to try to make more capacity available, and for a radio access network, taking into account inter service area interference when allocating physical network resources for use by the substitute VNF.

Another aspect of the disclosure provides a computer program having instructions that when executed by processing circuitry cause the processing circuitry to carry out the methods set out above. Another aspect provides a computer program product comprising a computer readable medium having stored on it the above-mentioned computer program.

Another aspect provides a configuration controller for making changes to configuration of a first service area of a communications network having a number of service areas capable of providing at least one service to at least one UE, User Equipment. The network having a plurality of VNFs, Virtual Network Functions, used in providing the services to the UEs according to the configuration. The configuration controller comprising a processing circuit and a memory circuit. The memory circuit containing instructions executable by the processor such that the configuration controller is operative to instantiate at least one substitute VNF corresponding to the first VNF in the case of a proposed change to the configuration of the first service area which could negatively impact at least one service provided to a first of the UEs using a first of the VNFs, if the change is made while the first VNF is in use. The configuration controller is also operative to transfer the first UE to use the substitute VNF instead of using the first VNF, and make the proposed change to the configuration with respect to one of these VNFs, the first VNF or the substitute VNF, while the service to the first UE is maintained using the other of these VNFs.

Yet another aspect provides a configuration controller for making changes to configuration of a first service area of a communications network. The communications network comprises a number of service areas capable of providing at least one service to at least one UE. The network also comprise a plurality of VNFs used in providing the services to the UEs according to the configuration. The configuration controller comprises an instantiation unit for instantiating at least one substitute VNF corresponding to the first VNF in the case of a proposed change to the configuration of the first service area which could negatively impact at least one service provided to a first of the UEs using a first of the VNFs if the change is made while the first VNF is in use. The configuration controller also comprises a transfer unit for transferring the first UE to use the substitute VNF instead of using the first VNF, and further comprises a configuration change unit for making the proposed change to the configuration with respect to one of these VNFs, the first VNF or the substitute VNF, while the service to the first UE is maintained using the other of these VNFs.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

Embodiments of the invention will now be described, by way of example, with reference to the appended drawings, in which.

DETAILED DESCRIPTION

Figure 1:
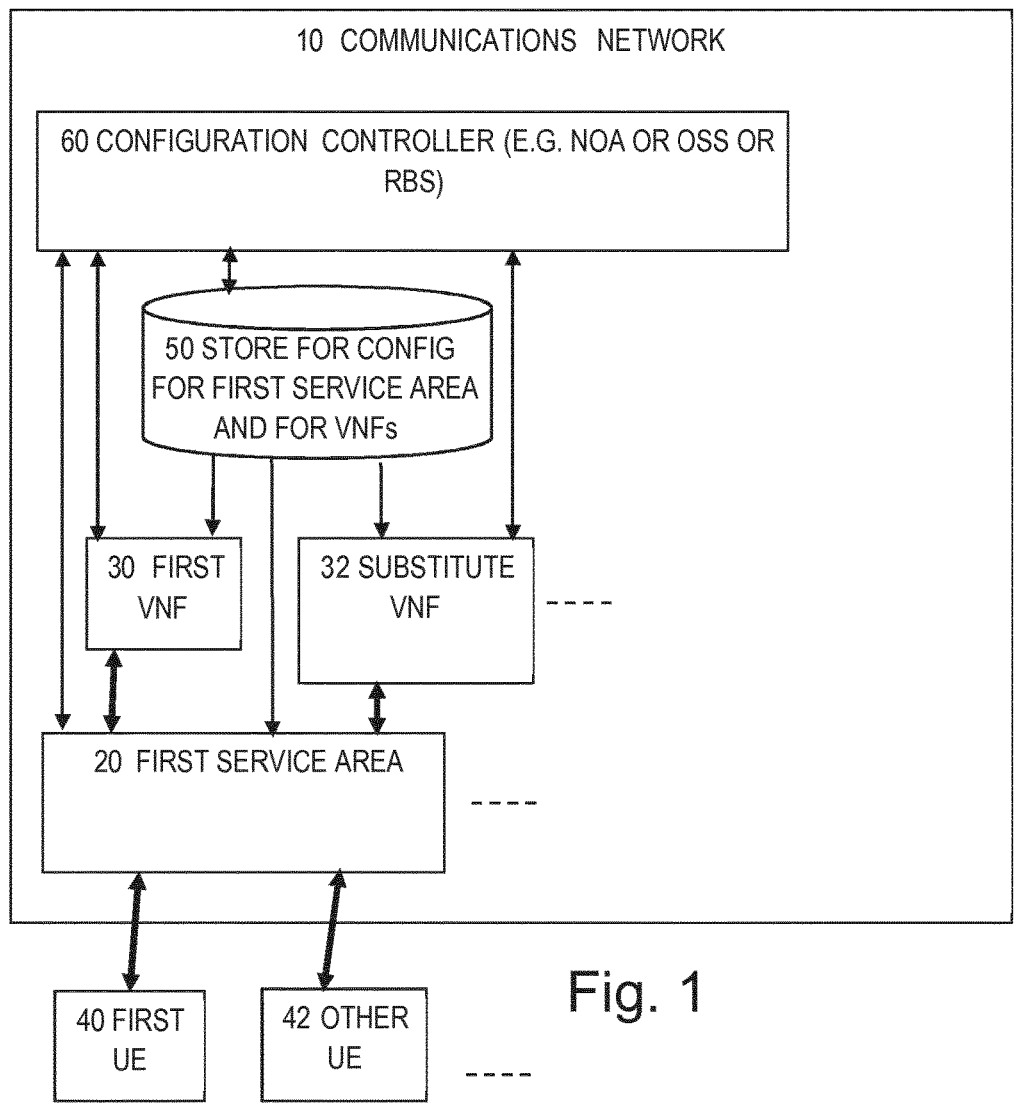
FIG. 1 shows an overall view of a configuration controller in a communications network.

The present invention will be described with respect to particular embodiments and with reference to certain drawings but the scope of the invention is not limited thereto and modifications and other embodiments are intended to be included within the scope of the disclosure. The drawings described are only schematic and are non-limiting. In the drawings, the size of some of the elements may be exaggerated and not drawn to scale for illustrative purposes.

Definitions

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

The steps of the methods described herein may be carried out in any suitable order, or simultaneously where appropriate.

References to computer programs or software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same location such as the rack, same room, same floor, same building, as appropriate, or distributed at different locations for example.

Service area is defined as encompassing a cell or multiple cells or any similar arrangement for coupling or attaching UEs in any way, in a given area of coverage to enable services to be provided to the UEs for communications, whether by means of radio or other means.

A substitute service area corresponding to a first service area is intended to encompass a complete replica of the first service area or any existing service area which is or can be made sufficiently overlapping in coverage and sufficiently similar to provide the service to UEs.

Services are intended to encompass any kind of communications service including voice, video, data, and so on, and any components of such services, or any associated services using such communications services.

Transfer is intended to encompass a hand-over or a change of which VNFs are used to provide the service to a respective UE.

Instantiate is intended to encompass instantiating virtual functions or allocating physical resources as well.

VNF is intended to encompass any virtualised network function, used in providing the service to the UEs, including functions that are partly virtualised and so still use some physical network resource.

Configuration is defined as encompassing for example any kind of changeable parameter or sequence or instruction or circuitry or anything that can define how the VNFs and the service areas operate or define their characteristics, relationships or identity, such as for example defining radio output power, radio frequencies, other communications parameters, or physical cell identity PCI. The configuration can be stored in any format and be located anywhere convenient, either external to the VNF or service area, or internally.

Configuration changes that could negatively impact a service to a UE using a VNF if the change is made while that VNF is in use, is intended to encompass anything which could noticeably affect the service to a UE, or risk affecting the service, such as changing a PCI, or changing a radio frequency band or a radio output power, or anything which might cause connection to the UE to be lost, or bandwidth of a connection to be reduced for example.

Abbreviations

BPF Base Processing Function
BSS Business Support Systems
DU Digital Unit
LB Load Balancing
LTE Long Term Evolution
NFG Network Forwarding Graph
NFV Network Function Virtualization
NFVI Network Function Virtualization Infrastructure
OSS Operation Support Systems
PCI Physical Cell Identifier
PDCCH Physical Downlink Control Channel
PPF Packet Processing Function
PRB Physical Resource Block
RAN Radio Access Network
RAT Radio Access Technology
RBS Radio Base Station
RCF Radio Control Function
RU Radio Unit
SDN Software Defined Networks
SON Self Organizing Networks
UE User Equipment
VNF Virtual Network Function
VNFFG VNF Forwarding Graph
VNG Virtual Network function Group
WCDMA Wideband Code Division Multiplex Access

Introduction

By way of introduction to the embodiments, some issues will be explained. The effect of network configuration changes being delayed until night time before being implemented is addressed by creating substitutes of VNFs used to provide the service to the UE so that the configuration changes can be made for those functions while the service to the UE is maintained. In some cases a service area can be replicated in its entirety. In some cases this can include replicating the configuration and relations to external functions and systems. The replication enables configuration changes to be made to one part while the service is maintained by the other, without impacting the service to the attached UE's.

In a virtualized system the logical paths between the service area and all the VNFs used in providing the service can be modelled by a VNFFG (Virtual Network Graph). The VNFs can be grouped into a VNG (Virtual Network function Group. Thus in replicating all that is needed to provide the service, based on the VNFFG, a substitute service area or areas and a substitute VNG having all the needed VNFs, and all the connections between them, can be instantiated. The replicated VNG is identical to the original VNG, and can be coupled to the replicated service area. Replication of the VNFs can mean for example spinning up a new VNG with the same configuration as the original VNG. If it only involves software and configuration a new instance of the VNG can be instantiated almost instantaneously. The original VNG and the replicated VNG can be referred to as a VNG pool. In a partly virtualized system, there may be a need to allocate physical network resources to instantiate the substitutes. In this case, if the configuration changes are to be made when the network is busy, some measures may be taken to ensure such allocations of physical network resources can be made without undue impact on the rest of the network, as will be described in more detail below with reference to FIG. 9 at least, for example.

FIG. 1, Overall View of Configuration Controller in Communications Network

FIG. 1 shows a schematic view of a communications network 10 which can be a cellular network, 5G network, fixed wireless access network and so on. User equipment devices 40, 42 are shown, which can be for example mobile devices such as laptops, handheld or wearable computing devices, smartphones, tracking devices, or fixed devices for fixed wireless access such as wired in appliances for homes, offices or factories, office equipment, equipment for remote monitoring or remote control devices and so on. The network has a number of service areas including a first service area 20. These service areas use VNFs to provide the service to the UEs. A first VNF 30 is shown and a substitute VNF 32 which may be instantiated as part of a configuration change procedure as will be described in more detail below. A store 50 is provided for storing configuration in the form of configuration parameters or any way of defining the configuration. This can be accessed by the first service area and by the VNFs to define how they provide the service to the UEs.

The UEs are attached to the first service area 20, and user traffic or communications overhead to be communicated across the communications network is shown by a thick arrow between each of the UEs, 40, 42, and the first service area 20. The user traffic or communications overhead can be passed on to the VNFs (again shown by a thick arrow) or passed between VNFs for processing following conventional practice. In carrying out such processing the first service area and the VNFs may refer to the configuration stored in the store 50, as shown by thinner arrows for configuration parameters defining how the service area and/or one or more of the VNFs should operate. Some of these configuration parameters can be set by a manufacturer, or set by an operator or controlled by an OSS for the network. They can encompass any type of parameter which is desirable to control, but those of particular relevance here are any configuration parameters which if changed while a VNF is in use, could negatively impact the service to a UE provided by one of the service areas using the VNF. This could occur for configuration parameters such as Physical Cell Identifier PCI, or radio output power or output frequency range for example.

Figure 2:
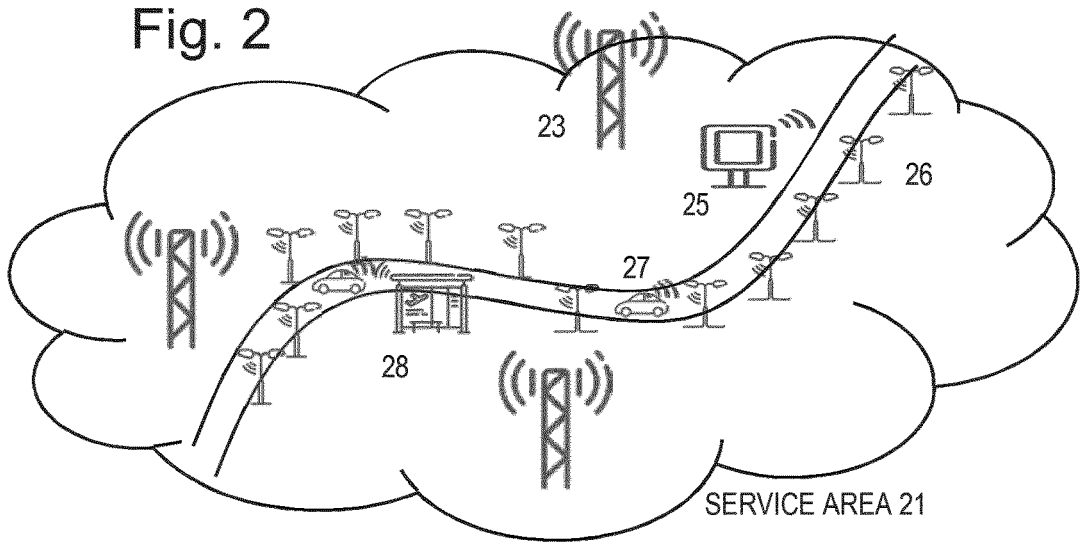
FIG. 2 shows a service area example.

FIG. 2, Service Area Example.

FIG. 2 shows a schematic view of a service area 21 of a communications network (e.g. 5G network) extending along an urban street having coverage defined by a number of low power antennas 26 on street lighting poles, and higher power antennas 23 on higher masts. Examples of UEs shown include cars 27 with connected equipment for location monitoring and remote monitoring of performance, a billboard 28 having a display and user interactivity controlled by connected equipment, and a bus stop 28 with connected display and bus location monitoring equipment. Many other examples can be envisaged. Any of the UEs can get mobile services or connectivity services from one or more antennas. In a typical cellular network the UE is attached to one cell having one antenna, and the methods described below are applicable to such cellular networks as well as the 5G example in which there can be more than one antenna providing connectivity & mobility services to the UE. In the case of mobile UEs, different sets of antennas can be involved in providing services according to the UE position. Conventionally cells were regarded as a fixed area served by one antenna. More generally now a service area can be a cell or can include more than one antenna with "MTP" (Multiple Transmit Point) functionality in 5G terminology for example.

Figure 3:
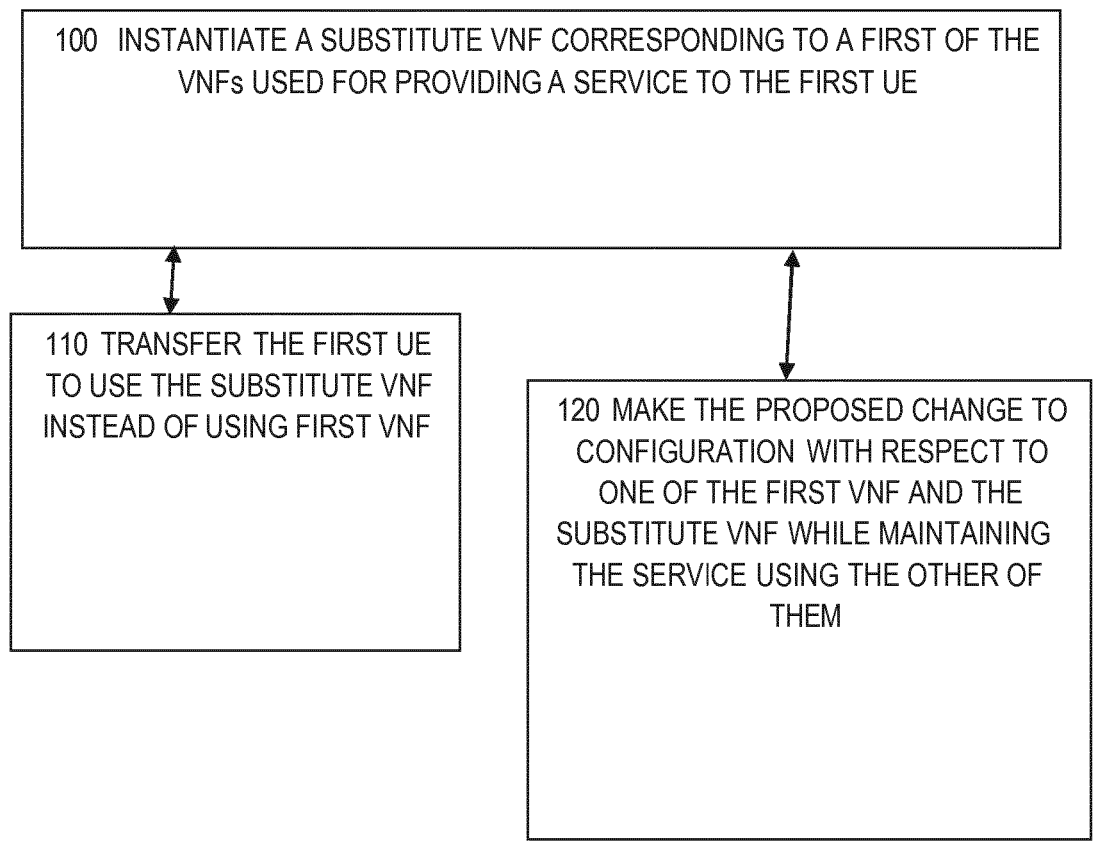
FIG. 3 shows steps in controlling configuration change according to an embodiment.

FIG. 3, Steps in Controlling Configuration Change According to an Embodiment

FIG. 3 shows some steps according to an embodiment of the invention, in controlling a configuration change in the communications network 10 shown in FIG. 1 for example, having a number of service areas, the first service area being capable of attaching at least one UE, 40, 42, and the network having a plurality of VNFs 30, 32 for providing service to UEs according to the configuration. In the case of a proposed change to the configuration which could negatively impact a service provided to a UE using a VNF, if the change is made while the VNF is in use, there are three steps shown. At step 100 at least one substitute VNF 32 is instantiated corresponding to a first VNF 30 of the VNFs used for providing service to the first UE. At step 110 the first UE is transferred to use the substitute VNF instead of using the first VNF. At step 120, either before or after step 110, as appropriate, the proposed change is made to the configuration with respect to one of these two VNFs, the first VNF and the substitute VNF, while the service to the first UE is maintained using the other one of these two VNFs. The change to the configuration can involve the respective VNF being directed to access a different storage address where the changed configuration parameter is stored for example. This can avoid the negative impact of the change because the respective VNF is effectively "off-line", or not in use or "live" at the time of the change of configuration. This means the VNF can make its state consistent with the changed configuration. If that means partially or fully resetting the VNF, this can now be done without risk of causing the communication with the UE to be lost, or other impact on the services provided to the UE. There are various ways the three steps illustrated can be carried out, and some examples will be described below, and various additional steps that can be carried out, again some will be described below.

By maintaining service by providing such a substitute VNF, any configuration changes which could negatively impact the services provided to the UE, no longer need to await a quiet period when few or no UEs are being provided with services. This can enable the timing of the configuration changes to be controlled, so they can be more rapid or more responsive to changing circumstances such as changes in load or in equipment availability or capacity. The methods described can remove the requirement to execute some parameter changes only during a maintenance window. It is an enabler which can lead to easier automation of configuration changes and help approach zero downtime in availability of network.

It can remove a restriction on the timing of network configuration changes. The configuration changes no longer need cell locking, and do not need to affect traffic performance or reduce traffic capacity in the service area. It means network optimization can be implemented at almost any time. This means there can be an optimized network much more of the time. PCI conflicts can now be resolved as soon as they are discovered. This means there can be a clean PCI distribution among the UEs. Also there can be reduced administration and planning overhead as parameter changes can be implemented at any time rather than needing to be planned.

In one example the UE may be provided with voice communications as one service and data as another service. These two services may be completely independent. Also, there may be more than one data service operating simultaneously in such a way that, for example, a movie is downloaded to the UE and does not consume the data allowance that the subscriber pays for. It may be that a VNF providing the movie download service is sensitive to a temporary loss of connection (such as might be caused by a configuration change) even when other services providing data for browsing internet, emails and other apps is still less sensitive to a temporary loss of connection. In this case, the VNF for providing the movie download service could be identified as being sensitive, and it could be substituted so as to maintain its service to the UE during a configuration change.

Figure 4:
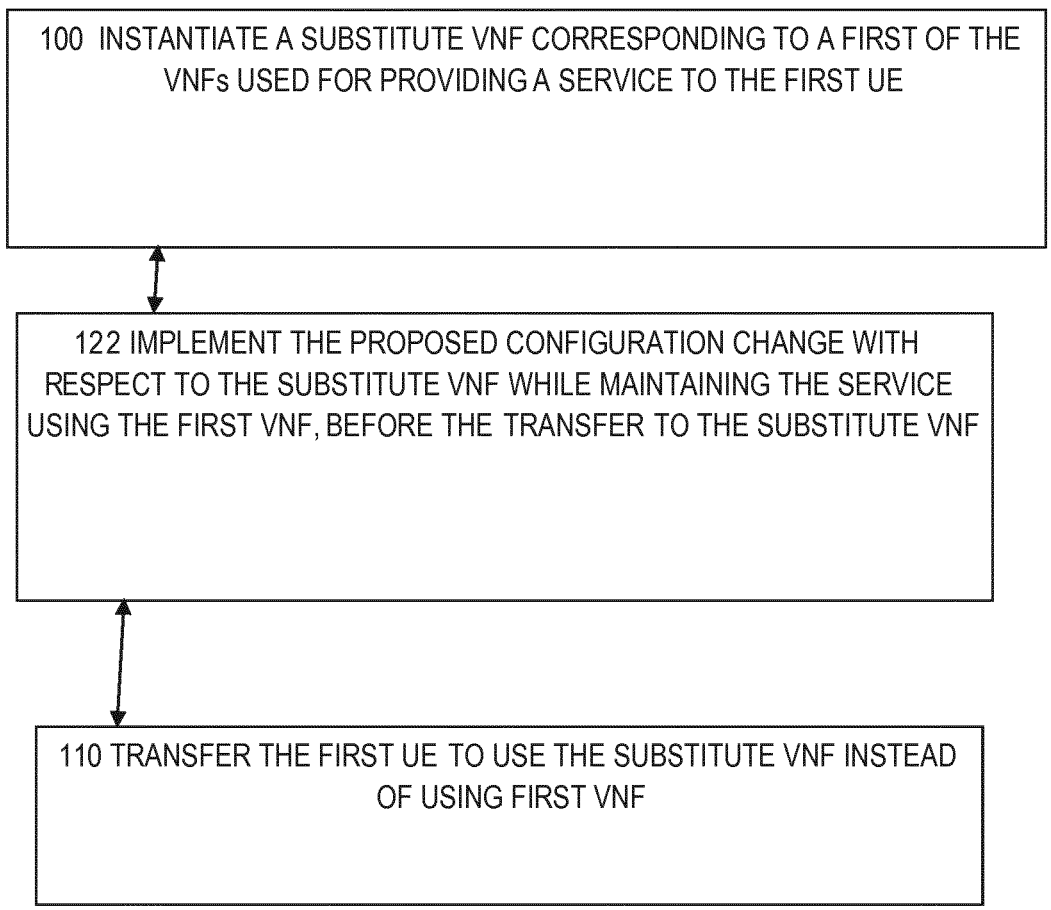
FIGS. 4 and 5 show examples showing the change before or after the transfer.
Figure 5:
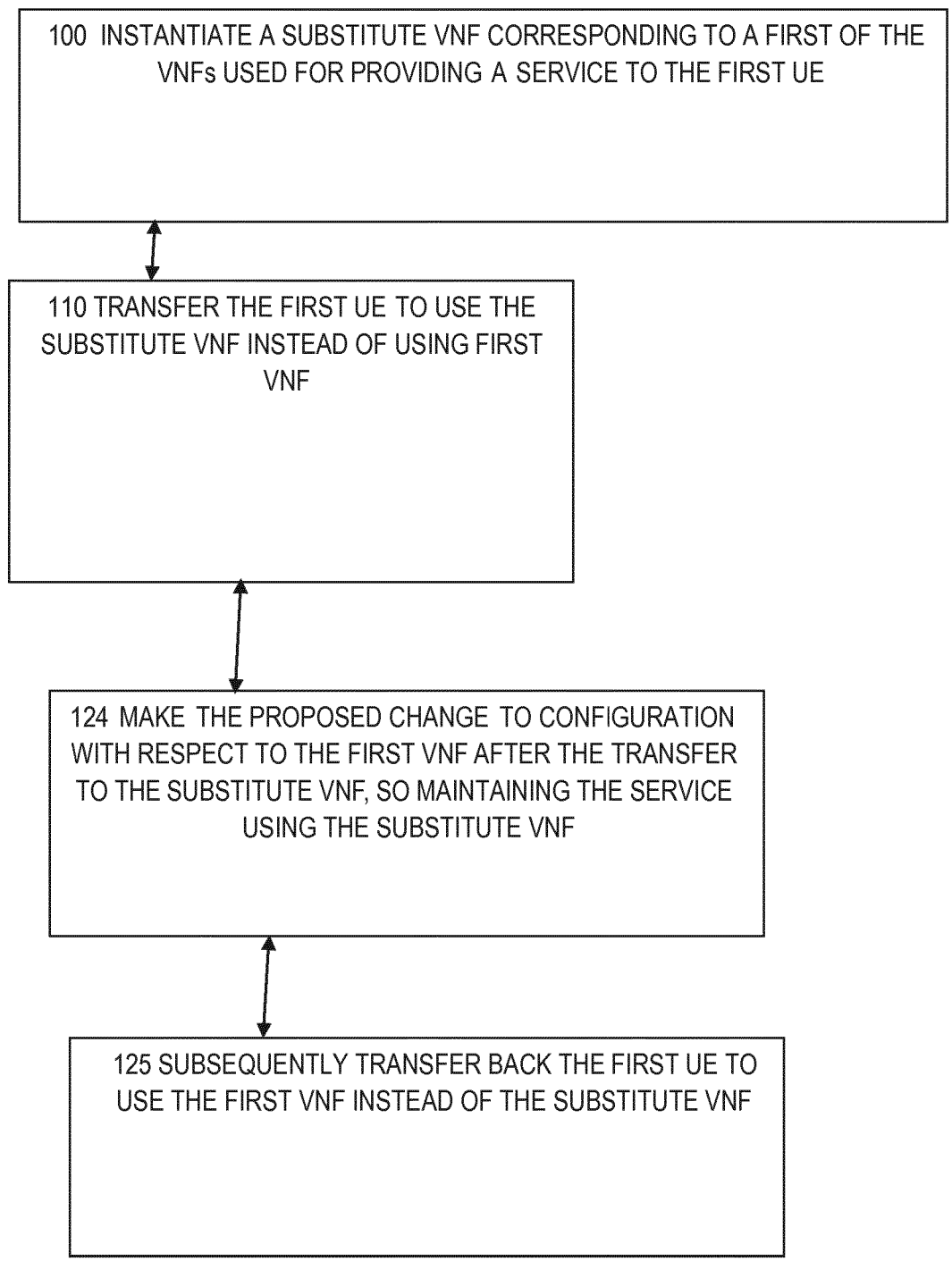

FIGS. 4 and 5, Examples Showing the Change Before or after the Transfer

FIG. 4 shows steps similar to those of FIG. 3 and corresponding reference signs have been used. When a configuration change is proposed which could negatively impact a service provided to a UE using a VNF 30, at step 100 at least one substitute VNF 32 is instantiated corresponding to a first VNF 30 of the VNFs used for providing the service to the first UE. At step 122, before the transfer step 110, the proposed change is made to the configuration with respect to the substitute VNF, while the service to the first UE is maintained using the first VNF. At step 110 the first UE is transferred to use the substitute VNF which is now operating according to the changed configuration instead of using the first VNF, which operates according to the old configuration. Subsequently the first VNF can be deleted. An advantage of the substitute VNF operating according to the changed configuration is that there is no need to hand back to the first VNF. Or, optionally, the first VNF can be changed to operate according to the changed configuration, and the first UE transferred to use the first VNF, then the substitute VNF can be deleted.

FIG. 5 shows steps similar to those of FIG. 3 and corresponding reference signs have been used. When a configuration change is proposed which could negatively impact a service provided to the UE using a VNF 30, at step 100 at least one substitute VNF 32 is instantiated corresponding to a first VNF 30 of the VNFs used for providing the service to the first UE. At step 110 the first UE is transferred to use the substitute VNF which is still operating according to the old configuration. At step 124, after the transfer step 110, the proposed change is made to the configuration with respect to the first VNF, while the service to the first UE is maintained using the substitute VNF. Then at step 125, the UE is transferred back to use the first VNF instead of the substitute VNF. There may be a benefit compared to the example of FIG. 4 if the first VNF has better performance for example if it had prior allocation of resources to those allocated to the substitute VNF, or if it had been optimised in other ways for example. This may be particularly useful if there are limited resources or other performance constraints.

Figure 6:
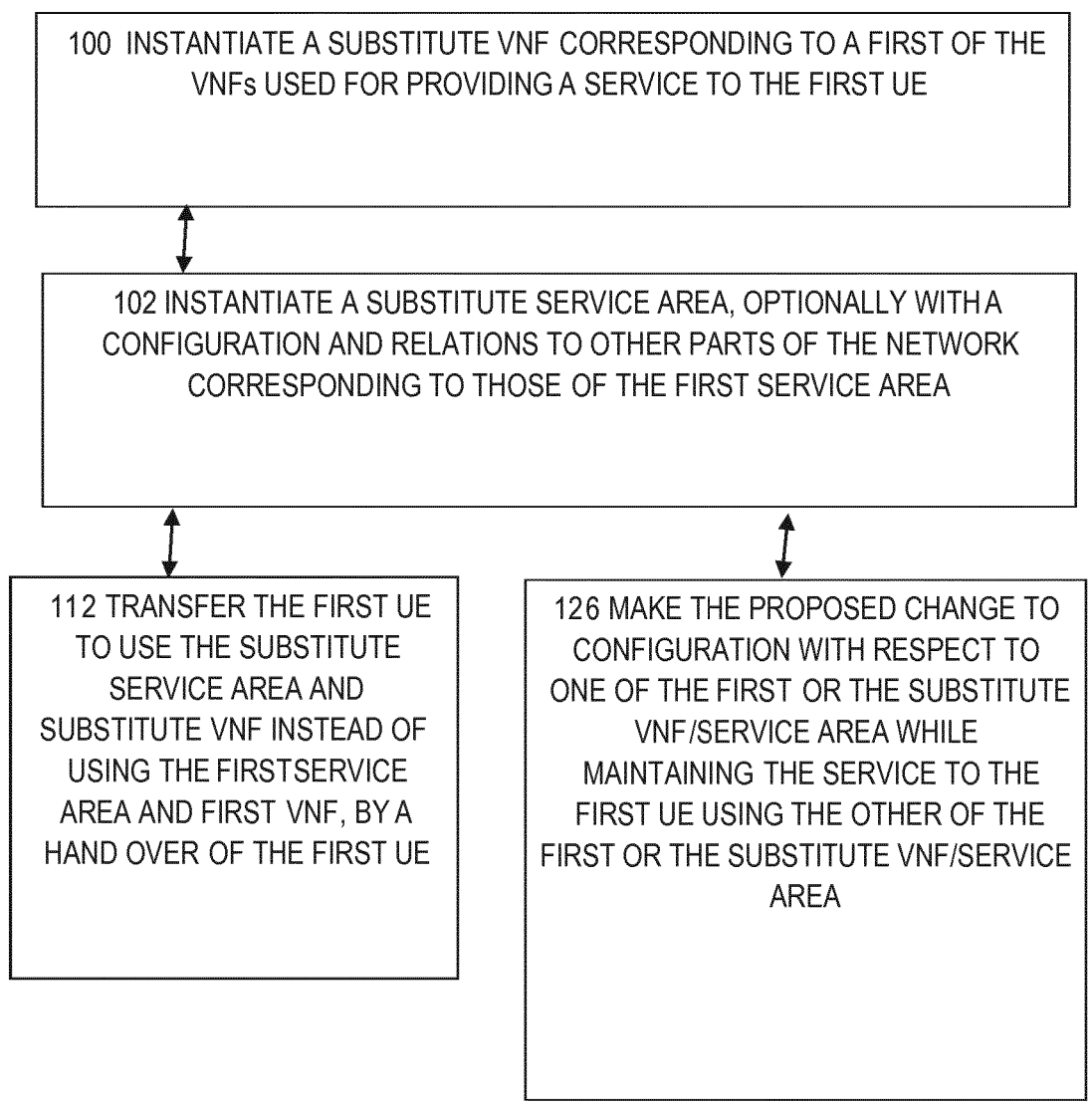
FIG. 6 shows an example having a substitute service area.

FIG. 6, Example Having Substitute Service Area

FIG. 6 shows steps similar to those of FIG. 3 and corresponding reference signs have been used. When a configuration change is proposed which could negatively impact a service provided to the UE using a VNF 30, at step 100 at least one substitute VNF 32 is instantiated corresponding to a first VNF 30 of the VNFs used for providing the service to the first UE. At step 102, (before or after or simultaneously with step 100, a substitute service area is instantiated, at least partially corresponding to the first service area, and optionally replicating the configuration and relations to other parts of the network. The substitute service area may be instantiated by creating a new service area from existing physical network resources, or using an existing neighbouring or overlapping service area, or by extending it to overlap for example.

At step 112 the first UE is transferred to use the substitute service area instead of the first service area by means of a hand-over, and to use the substitute VNF instead of using the first VNF. At step 126, either before or after step 110, as appropriate, the proposed change is made to the configuration with respect to one of these two service areas and VNFs, the first and the substitute, while the service to the first UE is maintained using the other one of these two. This means that negative effects on the service area from any configuration changes can now also be dealt with. The UE sees the transfer as a hand-over to the substitute service area. If not all of the VNFs used by the first UE are substituted, the configuration controller may need to control a transfer of user traffic from the substitute service area to these non-substituted VNFs. If the substitute service area has a configuration and relations to other parts of the network corresponding to those of the first service area, this can help enable a more seamless transfer of the UEs and help avoid disruption to the service.

Figure 7:
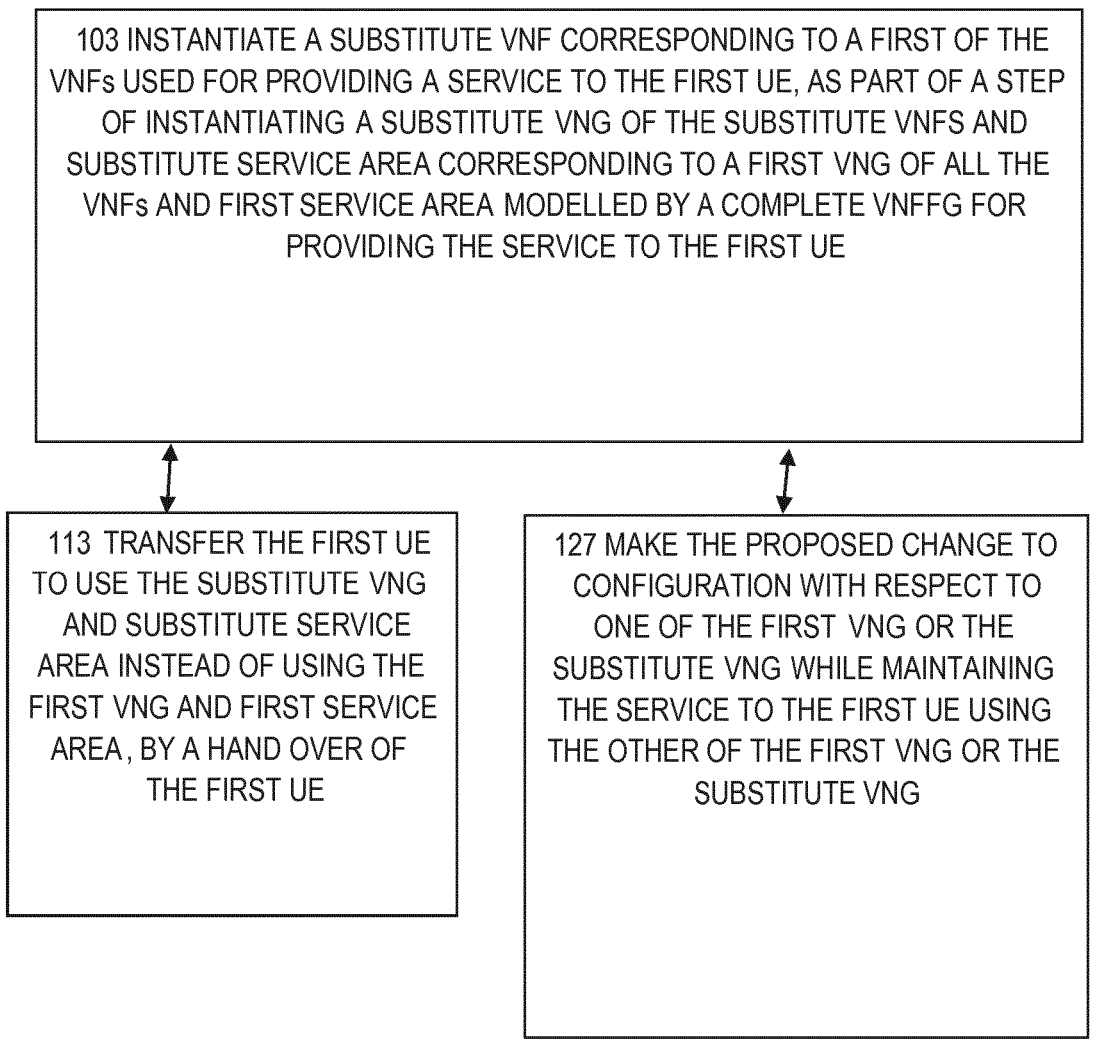
FIG. 7, shows an example having substitute VNF forwarding graph.

FIG. 7, Example Having Substitute Group of all VNFs Modelled by VNFFG

FIG. 7 shows steps similar to those of FIG. 3 and corresponding reference signs have been used. When a configuration change is proposed which could negatively impact a service provided to the UE using a VNF 30, at step 103 at least one substitute VNF 32 is instantiated corresponding to a first VNF 30 of the VNFs used for providing the service to the first UE, as part of a step of instantiating a substitute VNG of substitute VNFs and substitute service area or areas corresponding to a first VNG of all the VNFs and first service area modelled by a complete VNFFG for providing the service. At step 113, the first UE is transferred to use the substitute service area and substitute VNG instead of the first service area and first VNG by means of a hand-over. At step 127, either before or after step 113, as appropriate, the proposed change is made to the configuration with respect to one of these VNGs, the first and the substitute, while the service to the first UE is maintained using the other one of these VNGs.

For the case that the substituted entities include the service area and all the VNFs modelled by the VNFFG for that service, there should be no other transfers to manage other than the hand-over of the UE from the first service area to the substitute service area. Again, this can help enable a more straightforward transfer of the UEs and help avoid disruption to the service.

Figure 8:
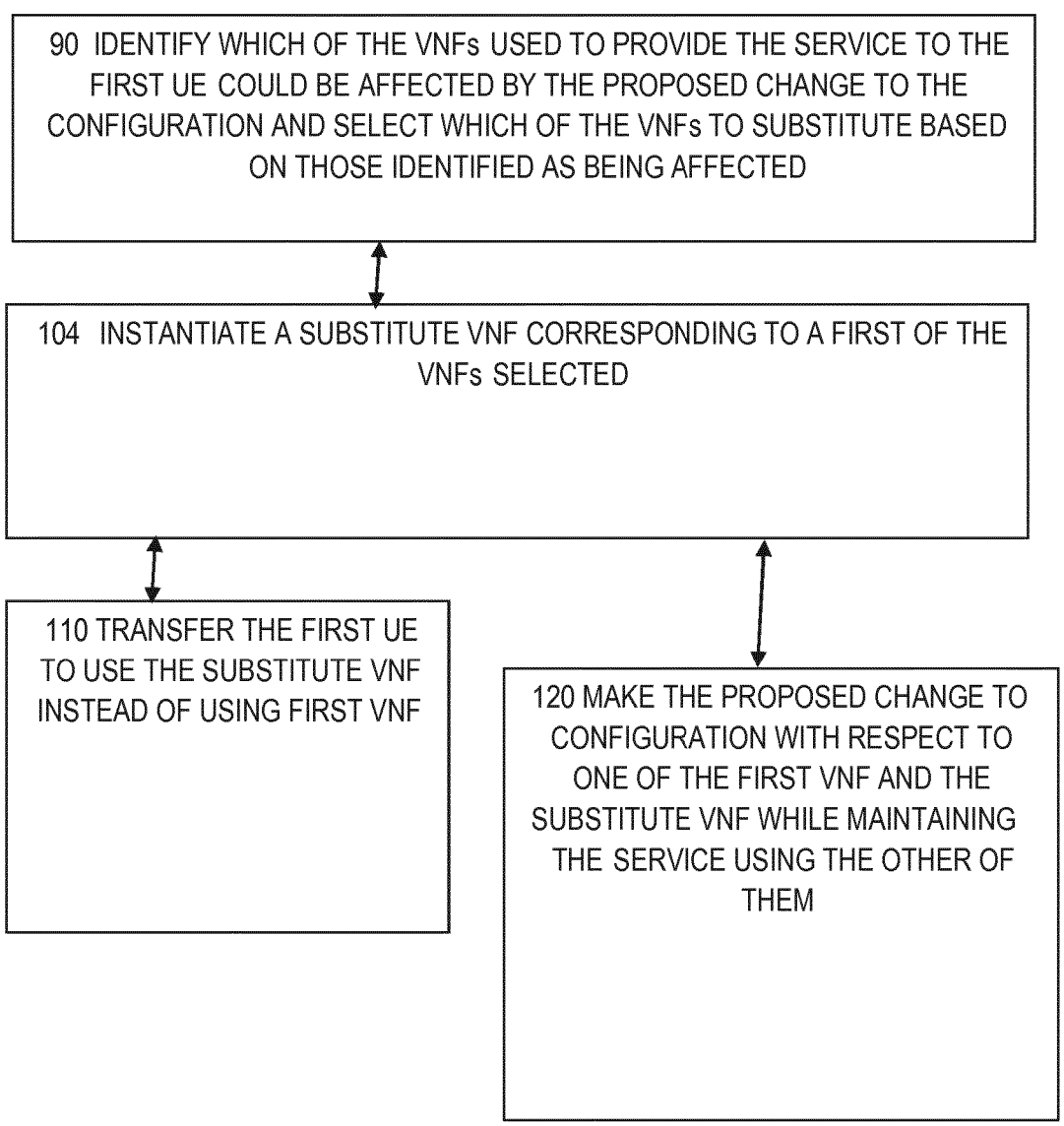
FIG. 8 shows an example involving identifying which VNFs to substitute.

FIG. 8, Example Involving Identifying which VNFs to Substitute

FIG. 8 shows steps similar to those of FIG. 3 and corresponding reference signs have been used. When a configuration change is proposed which could negatively impact a service provided to the UE using a VNF 30, at step 90 there is a preliminary step of identifying which of the VNFs could be affected by the proposed change to the configuration. The selection of which VNFs to substitute can be based on which are identified as being affected. At step 104 at least one substitute VNF 32 is instantiated corresponding to a first VNF 30 of the VNFs selected. At step 110 the first UE is transferred to use the substitute VNF instead of using the first VNF. At step 120, either before or after step 110, as appropriate, the proposed change is made to the configuration with respect to one of these two VNFs, the first VNF and the substitute VNF, while the service to the first UE is maintained using the other one of these two VNFs. An advantage of such selection is that it can help minimise the number of VNFs being substituted and thus reduce the amount of resources and time needed for the instantiation step, though the transfer may be more complex than the case where the entire VNF forwarding graph is substituted. This is especially useful if physical resources are a constraint.

Figure 9:
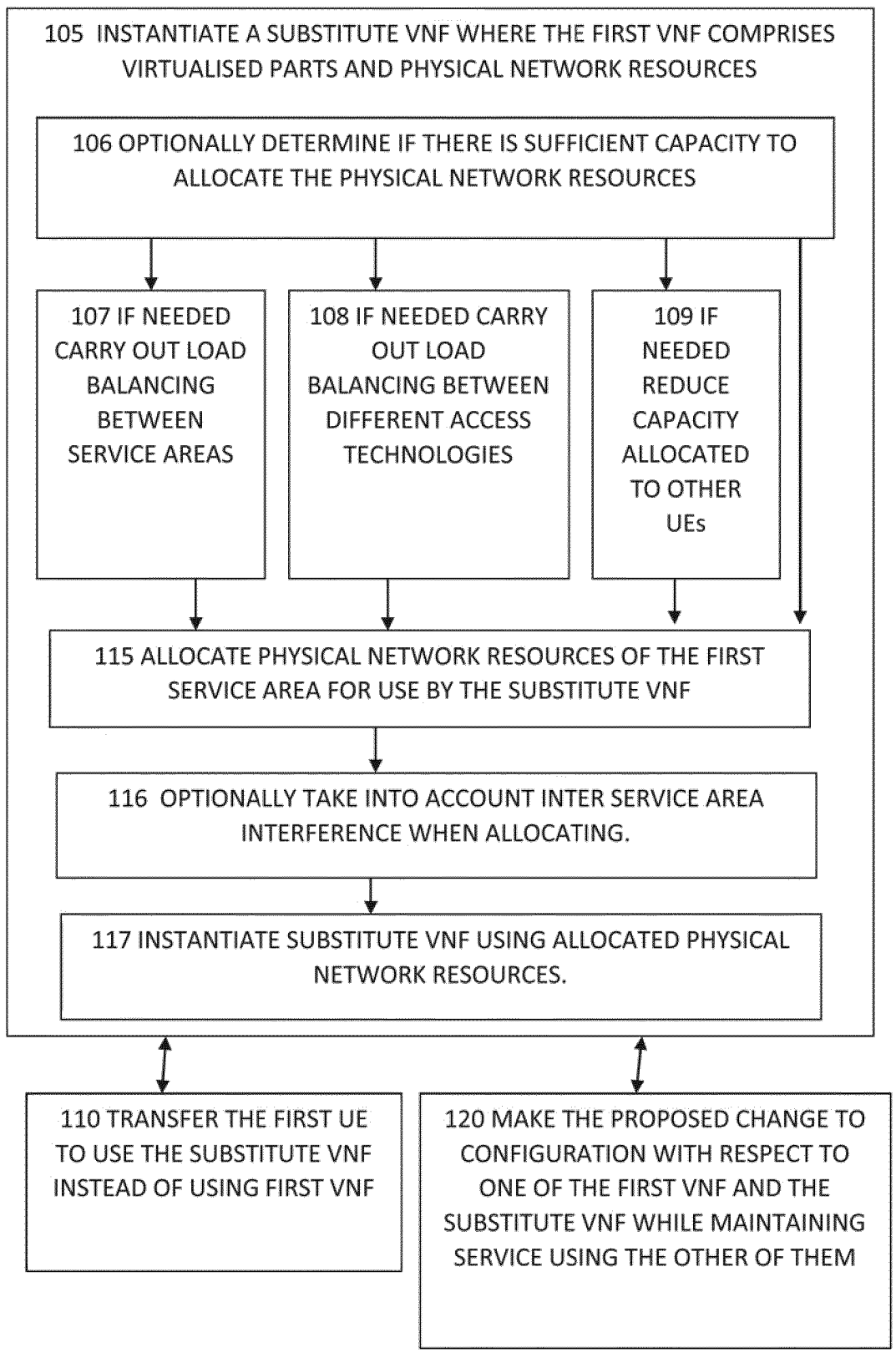
FIG. 9 shows an example instantiation involving allocating physical network resources.

FIG. 9, Example Instantiation Involving Allocating Physical Network Resources

FIG. 9 shows steps similar to those of FIG. 3 and corresponding reference signs have been used. At step 105 at least one substitute VNF 32 is instantiated corresponding to a first VNF 30 of the VNFs used for providing the service to the first UE, and the first VNF comprises virtualised parts and physical network resources 80. By substituting VNFs comprising physical network resources, the effects of configuration changes on such parts can be reduced.

Inside this step 105 are a number of component steps as follows. First, at step 106, optionally it is determined whether there is sufficient capacity to allocate the physical network resources. This can help pre-empt possible problems caused by limited capacity and thus help enable configuration changes even when the network is busy. There are shown three subsequent steps in parallel, indicating that any or all of these may be carried out if needed to free up more capacity. These three steps may be ignored if there is sufficient capacity. Of these three steps, step 107 involves carrying out load balancing between service areas, a way of freeing up some capacity if there is spare capacity at an overlapping service area. Step 108 involves carrying out load balancing between different access technologies, if there are multiple different access technologies in use by that service area. Step 109 involves reducing capacity allocated to other UEs. Each of these steps can help mitigate the need for more physical network resources by the configuration controller, and thus reduce the effects on other parts of the network.

In preferred embodiments capacity is allocated to UEs based on their service demand, quality and plan. At the same time, the VNFs carrying data need to be reserved for providing the data to the UEs. Some VNFs only control signalling part (that will not require high capacity), but VNFs operating as data carrier needs mentioned earlier to be aligned based on capacity needs of the UE.

Subsequently at step 115 there is a step of allocating physical network resources of the first service area for use by the substitute VNF. An optional step 116 is to take into account inter service area interference which can encompass inter cell interference ICI for example, when allocating these physical network resources. This is another way of reducing the impact on other services. Then at step 117 the substitute VNF is instantiated using the allocated physical network resources. As in FIG. 3, at step 110 the first UE is transferred to use the substitute VNF instead of using the first VNF. At step 120, either before or after step 110, as appropriate, the proposed change is made to the configuration with respect to one of these two VNFs, the first VNF and the substitute VNF, while the service to the first UE is maintained using the other one of these two VNFs.

Figure 10:
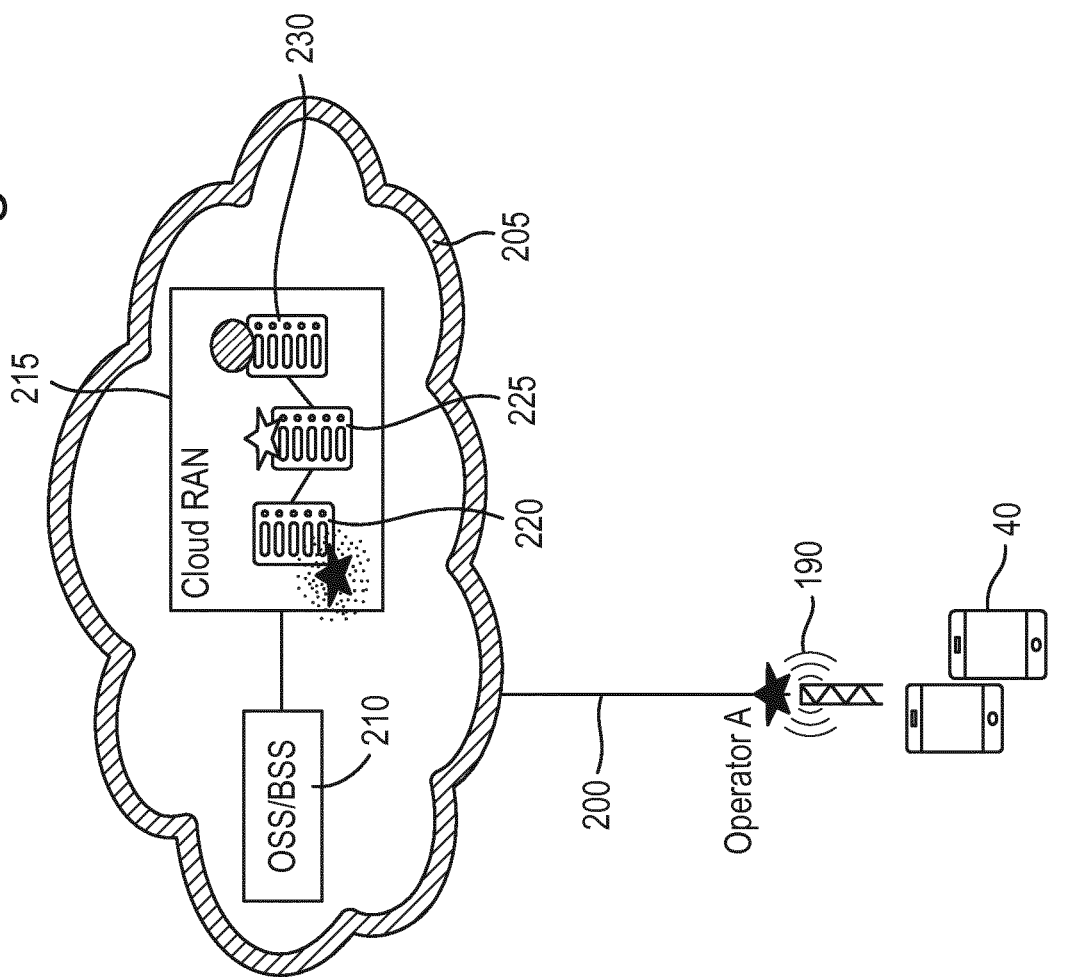
FIG. 10 shows an example showing VNFs running on a cloud RAN.

FIG. 10 Example Showing VNFs Running on Cloud RAN

FIG. 10 shows a schematic view of a communications network of an operator A showing one antenna 190 (other antennas are not shown), for radio communications with UEs 40, and a communications link 200 to cloud infrastructure 205. The antenna will have co located physical network resource for carrying out de centralized SON VNFs. Within the cloud infrastructure are shown an OSS/BSS 210, and a cloud RAN 215. Within the cloud RAN are shown servers hosting an orchestrator 230 in the form of an NOA, a number of centralized SON VNFs 225 and a number of hybrid SON VNFs 220. The centralized VNFs are completely virtualised. The hybrid and decentralized VNFs are partially virtualized but need some physical network resource such as that located at the antenna, which needs to be allocated as described above. Some VNFs may be used for providing functions which need low latency, such as those relating to time critical services such as remote control of vehicles. These VNFs may need to be hosted close to their service area. Other VNFs may provide functions for services which are not time critical and can tolerate high latency, such as communicating maintenance status reports from installed infrastructure such as that for water supply or electricity supply. Some of the steps and interactions between these entities to achieve the configuration changes will be described below in more detail with reference to FIGS. 12 and 13, implementing the methods described above in more general terms with reference to FIGS. 4 and 5 respectively.

Figure 11:
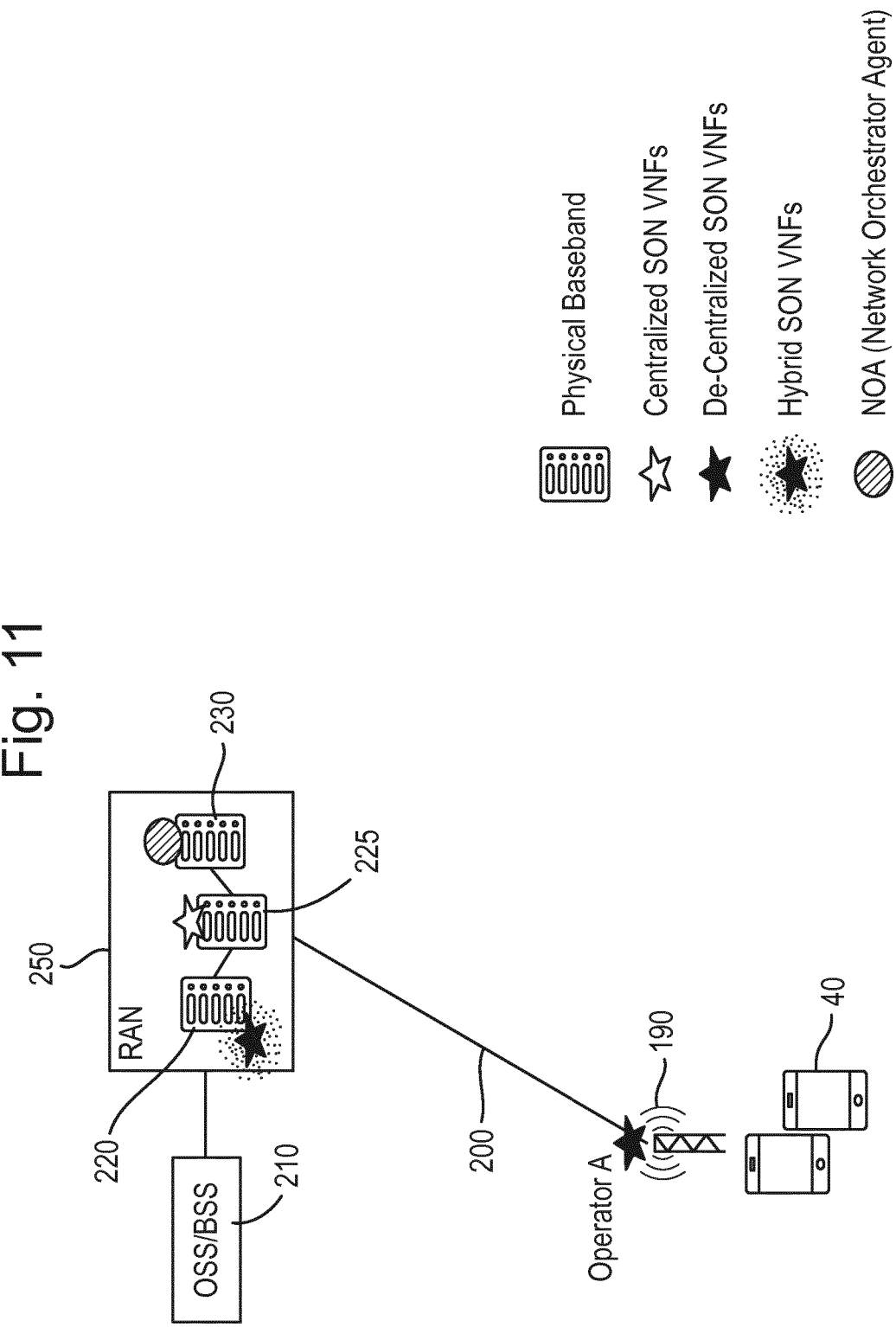
FIG. 11 shows an example showing VNFs running on a non-cloud RAN.

FIG. 11 Example Showing VNFs Running on Non-Cloud RAN

Figure 12:
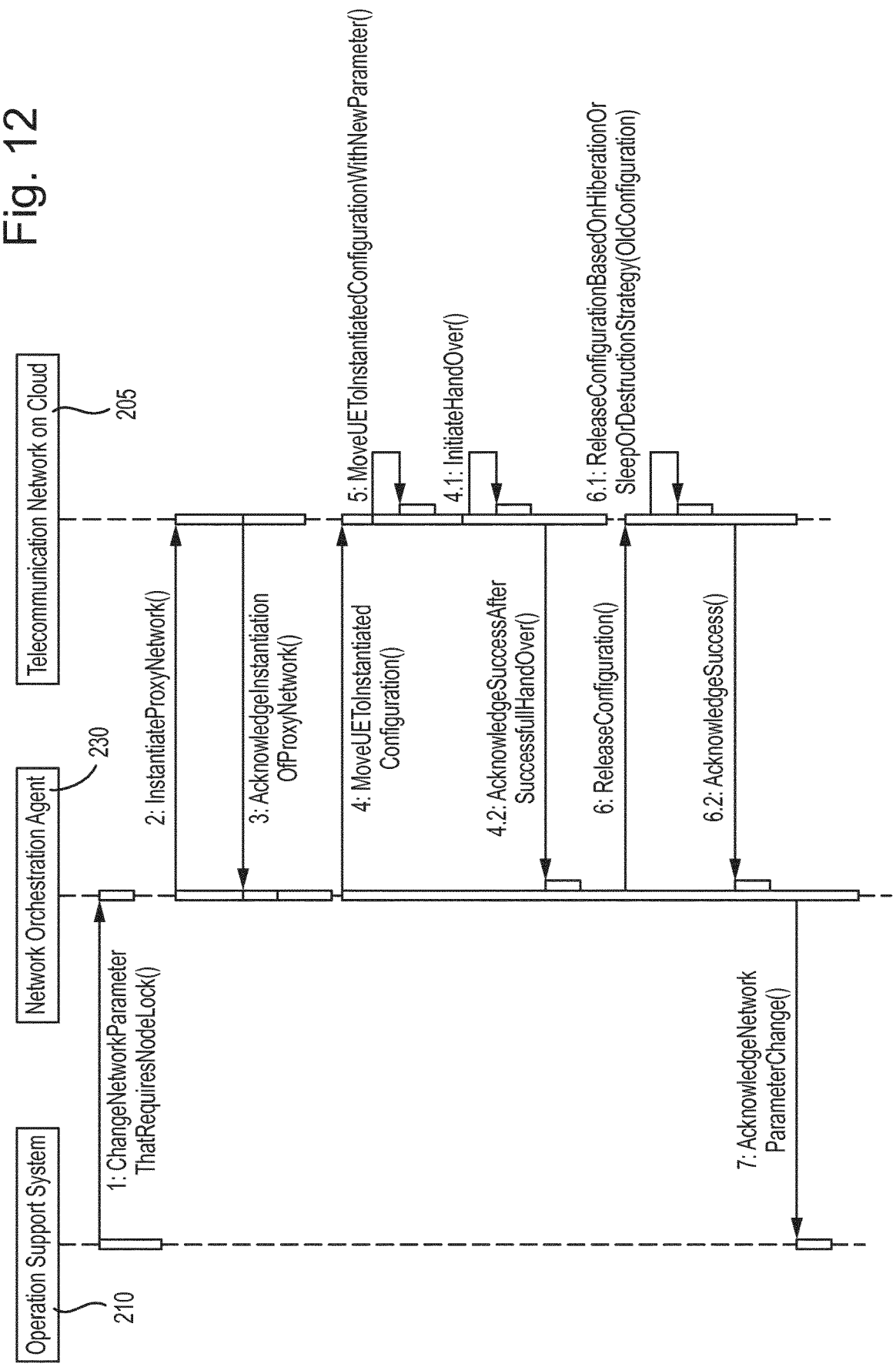
FIGS. 12 and 13 show sequence diagrams for examples showing interactions between OSS, orchestrator and cloud.
Figure 13:
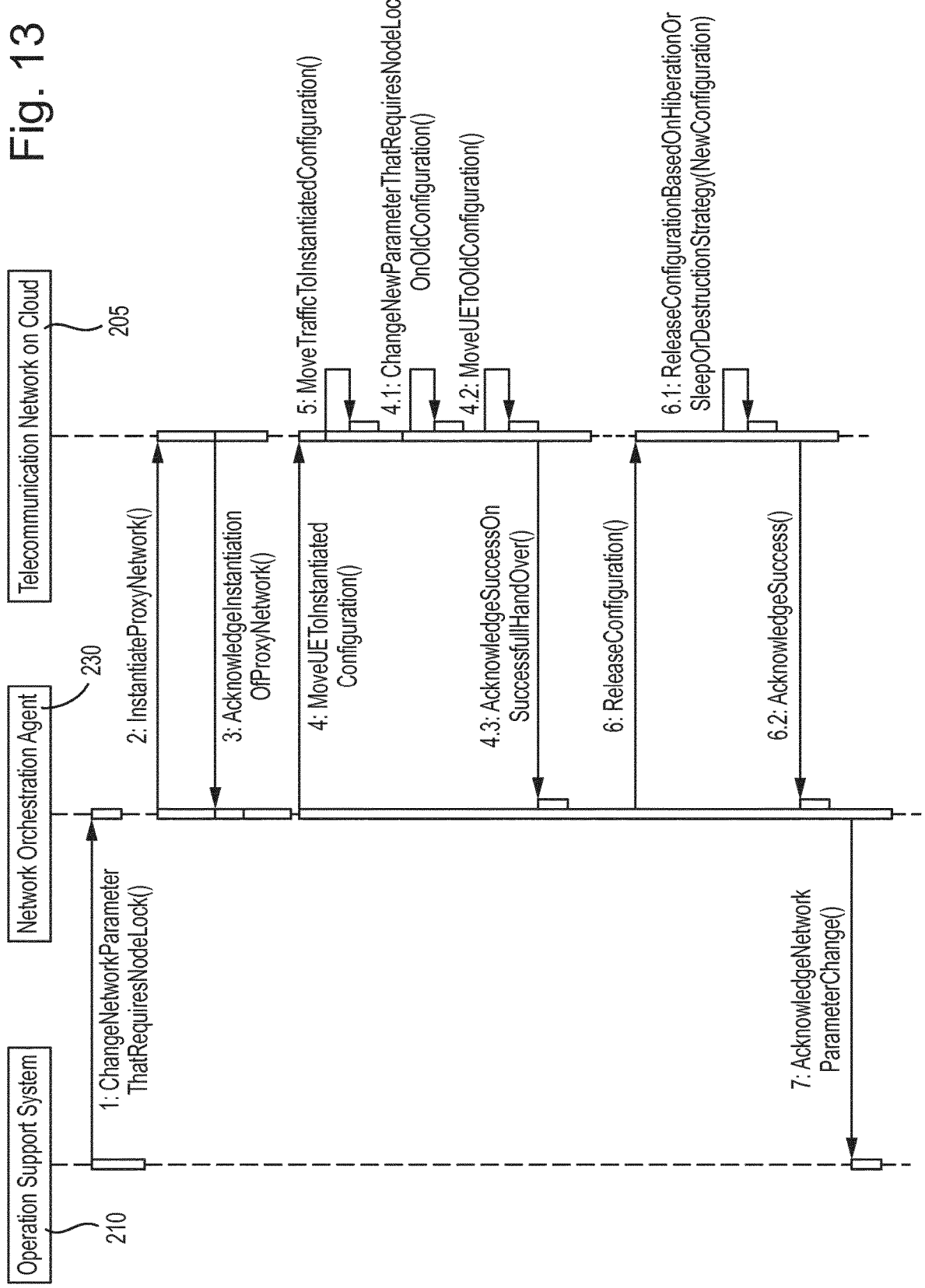

FIG. 11 shows a schematic view similar to that of FIG. 10 and similar reference signs have been used as appropriate. In this case, instead of there being cloud infrastructure and a cloud RAN, there is a RAN 250, having its own hardware such as servers for hosting the orchestrator 230 in the form of an NOA, a number of centralized SON VNFs 225 and a number of hybrid SON VNFs 220. The decentralized SON VNFs can be co-located with the antenna or at the RAN. As in FIG. 10, any of these SON VNFs can be included in the VNFs described above for providing the service to the UEs. FIGS. 12 and 13, Examples Showing Interactions Between OSS, Orchestrator and Cloud FIGS. 12 and 13 show sequence diagrams with time flowing down the figures. The left hand column shows actions of the OSS/BSS 210. The central column shows actions of the orchestrator in the form of the NOA 230. The right hand column shows actions of the telecommunication network on the cloud infrastructure 205. Arrows between the columns show the direction of communications or interaction. FIG. 12 shows a sequence diagram implementing the method described above in more general terms with reference to FIG. 4. At step 1 the OSS/BSS initiates the process by sending a request called ChangeNetworkParameterThatRequiresNodeLock to the orchestrator 230. Subsequently at step 2, in response, the orchestrator 230 sends a request called InstantiateProxyNetwork to the telecoms network on cloud 205. An acknowledgement of this is returned at step 3, when completed.

The orchestrator then sends at step 4 a request called MoveUEToInstantiatedConfiguration to the telecoms network on cloud 205. This prompts the telecoms network on cloud 205 to carry out the action shown as step 5 called MoveUEToInstantiatedConfigurationWithNewParameter( ). This is followed by step 4.1 of initiateHandOver by the telecoms network on cloud 205. Step 4.2 is an acknowledgement of success of the Hand-over sent to the NOA. Step 6 is the NOA sending a request called ReleaseConfiguration( ) to the telecoms network on cloud 205 to carry out the action shown as step 6.1 called ReleaseConfigurationBasedonHibernationOrSleepOrDestructionStrategy. This enables the VNFs of the old configuration to be destroyed. An acknowledgement is returned at step 6.2 to the NOA, which prompts the NOA to send at step 7 an acknowledgement of the parameter change success to the OSS/BSS.

FIG. 13 shows a sequence diagram corresponding to an implementation of the method described above in more general terms with reference to FIG. 5. This FIG. 13 differs from FIG. 12 in that the parameter change is done on the original VNFs not the newly instantiated ones, and the UE is transferred back to the old VNFs after they have had the configuration change.

At step 1 the OSS/BSS initiates the process by sending a request called ChangeNetworkParameterThatRequiresNodeLock to the orchestrator 230. Subsequently at step 2, in response, the orchestrator 230 sends a request called InstantiateProxyNetwork to the telecoms network on cloud 205. An acknowledgement of this is returned at step 3, when completed.

The orchestrator then sends at step 4 a request called MoveUEToInstantiatedConfiguration to the telecoms network on cloud 205. This prompts the telecoms network on cloud 205 to carry out the action shown as step 5 called MoveTrafficToInstantiatedConfiguration( ). This differs from FIG. 12 in that the substitute VNFs do not have the new configuration. This is followed by step 4.1 called ChangeNewParameterThatRequiresNodeLockOnOldConfiguration ( ) by the telecoms network on cloud 205. Then Step 4.2 is called MoveUEToOldConfiguration( ), meaning transfer back to use the original VNFs rather than the substitute VNFs. Step 4.3 is an acknowledgement of success of the Hand-over sent to the NOA. Step 6 is the NOA sending a request called ReleaseConfiguration( ) to the telecoms network on cloud 205 to carry out the action shown as step 6.1 called ReleaseConfigurationBasedonHibernationOrSleepOrDestructionStrategy(NewConfiguration). This means the substitute VNFs can be destroyed. An acknowledgement is returned at step 6.2 to the NOA, which prompts the NOA to send at step 7 an acknowledgement of the parameter change success to the OSS/BSS.

Physical Resource Allocation:

Most of the base band functionalities starting from Layer 3 can be virtualized. Layer 1 and Layer 2 Radio and baseband aspects are less straightforward or less efficient to virtualize and have a closer tie to the physical network resource such as the hardware for signal processing. As the vRAN (virtual RAN) network architecture evolves more will move to cloud. Until that vRAN architecture evolution happens some of the physical capacity of radio units depends on the network load and hardware. This leads to new challenges in addressing the "Zero impact configuration". To mitigate the current scenario following methods are proposed.

Methods Mitigating Physical Network Resource Capacity Limitations of Radio Unit: Mitigation Method 1) Corresponding to Step 107 of FIG. 9

This applies when only one RAT (Radio Access Technology) is active on the radio unit (example: LTE). Generally, for the above methods of changing configuration, the capacity of the radio unit is not a limiting factor. But, given a sudden network traffic surge, a load balance of a radio unit between two or more service areas, such as logical cells, may need to be altered. In such extreme cases, the orchestrator such as the NOA can act as follows:

When utilization is below a threshold (for example: In LTE, normally in a serving area or a Cell coverage area, the PRB (Physical Resource Blocks) are not utilized 100% of the time). Load balancing like the SON (Self Organizing Networks) function performs the load balancing between service areas and maintains the cell availability in a non-congested way. The NOA is triggered to act only when the cell is not in the scope of SON load balancing function or if the SON load balancing function is not active. Then the OSS instructs the "SON load balancing" to consider the cell under its scope for load balancing. This is an example of implementing step 107 of FIG. 9 described above, and should cause the load to reduce so that the OSS can request the NOA to allocate physical network resources start the configuration change as shown in the rest of FIG. 9, or in FIGS. 10 and 11 for example.

Alternatively, in a case when SON load balancing function is not active or enabled in the network, then the OSS activates the orchestrator (e.g. the Network Orchestrator Agent) based on PDCCH or PRB utilization threshold for example. Only when PDCCH or PRB utilization is less than a threshold (user configurable), is the orchestrator activated to carry out the allocation of physical network resources at step 115 of FIG. 9 and the rest of the configuration change procedure. This corresponds to bypassing steps 107, 108, and 109 of FIG. 9. Alternatively, if load balance is not able to balance the load, in that case the user throughput is reduced for existing UEs, and new UEs are provided with lesser throughput, as shown in step 109 of FIG. 9. Once this is successfully done, the orchestrator is activated to carry out the rest of the configuration change procedure. This approach can be significantly better than performing configuration changes only during maintenance windows. Note: The response time of SON functions are immediate in most of the cases.

Mitigation Method 2) Corresponding to Step 108 of FIG. 9

When multiple RAT (Radio Access Technology) is active on the radio unit, (for example WCDMA and LTE) in parallel. In such cases the NOA evaluates whether WCDMA and LTE are not congested. If any of the service areas (such as cells) are congested, the OSS performs the actions as defined in Mitigation Method 1) to balance load between the different access technologies. On successful completion of Mitigation Method 1), the OSS causes the orchestrator to carry out the allocation of physical network resources at step 115 of FIG. 9 and the rest of the configuration change procedure. This corresponds to step 108 of FIG. 9.

Mitigation Method 3) Corresponding to Step 116 of FIG. 9

Interference can occur between co-located service areas which are overlapping in location and frequencies. Latitude, longitude and azimuth can be the same for these service areas. In such cases interference could be a problem. The OSS triggers the orchestrator (NOA) to do the physical network resource allocation only after a check for such interference by a ISIC (Inter service area Interference Co-ordination) function and/or CoMP (Co-ordinated Multi-Point) function. ISIC ensures different resource elements are used between the existing service area and any newly instantiated substitute service area. The CoMP function can convert interference into useful signal. This step can be done additionally to Mitigation Methods 1 and 2).

Figure 14:
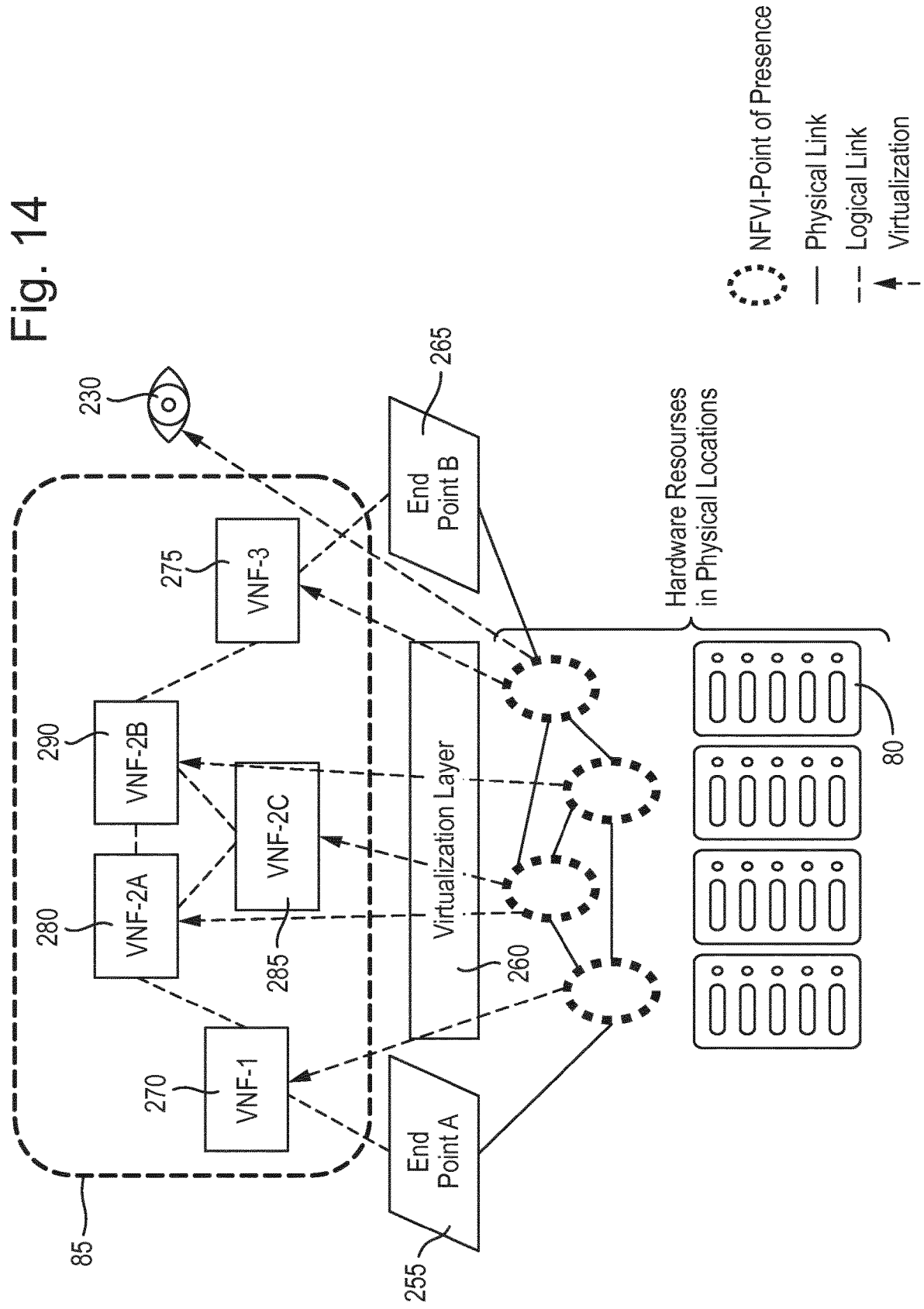
FIG. 14 shows an example of a VNG, VNFs, a virtualization layer and physical network resources.

FIG. 14 View of VNG, VNFs, Virtualization Layer and Physical Network Resources FIG. 14 shows a schematic view of an example of a VNG 85 having a number of VNFs logically coupled in a sequence between an end point A 255 and an end point B 265 to provide communications service to a UE, and modelled by a VNFFG, defining the service. These endpoints can be for example the service areas of the source and destination of a mobile to mobile phone call, or one of the endpoints could be a gateway to another network such as the internet for a data traffic example such as retrieving a web page. The endpoints can be effectively intermediate points in a longer traffic path or graph made up of more than one of these sequences shown. The sequence of functions is shown by logical links between VNFs shown by dotted lines in this example. The VNFs are run on physical network resources in the form of hardware shown as servers 80 located at a number of NFVI points of presence, linked by physical links shown as solid lines. There is a virtualization layer 260 to enable the VNFs to run on the hardware, while being insensitive to which hardware. These virtualization connections are shown by dotted arrows. The sequence of functions in this example starts at end point A 255, and passes to VNF-1 270 then passes to VNF-2A 280 then there are parallel paths to VNF-2B 290, one of them passing via VNF-2C 285. The next links in the sequence are to VNF-3 275 and then to end point B 265. All the VNFs shown, and the logical paths between them can be modelled by a VNF forwarding graph for providing the communications service to the UE across the cellular network. Also the subset of VNFs shown as VNF-2A, VNF-2B, and VNF-2C could be an example of a component function of the service and modelled as its own VNF forwarding graph. This component function could be a SON function or SDN or any relevant network functions such as layer 3 or higher layer functions, and there could be many of these component functions making up the overall service.

Figure 15:
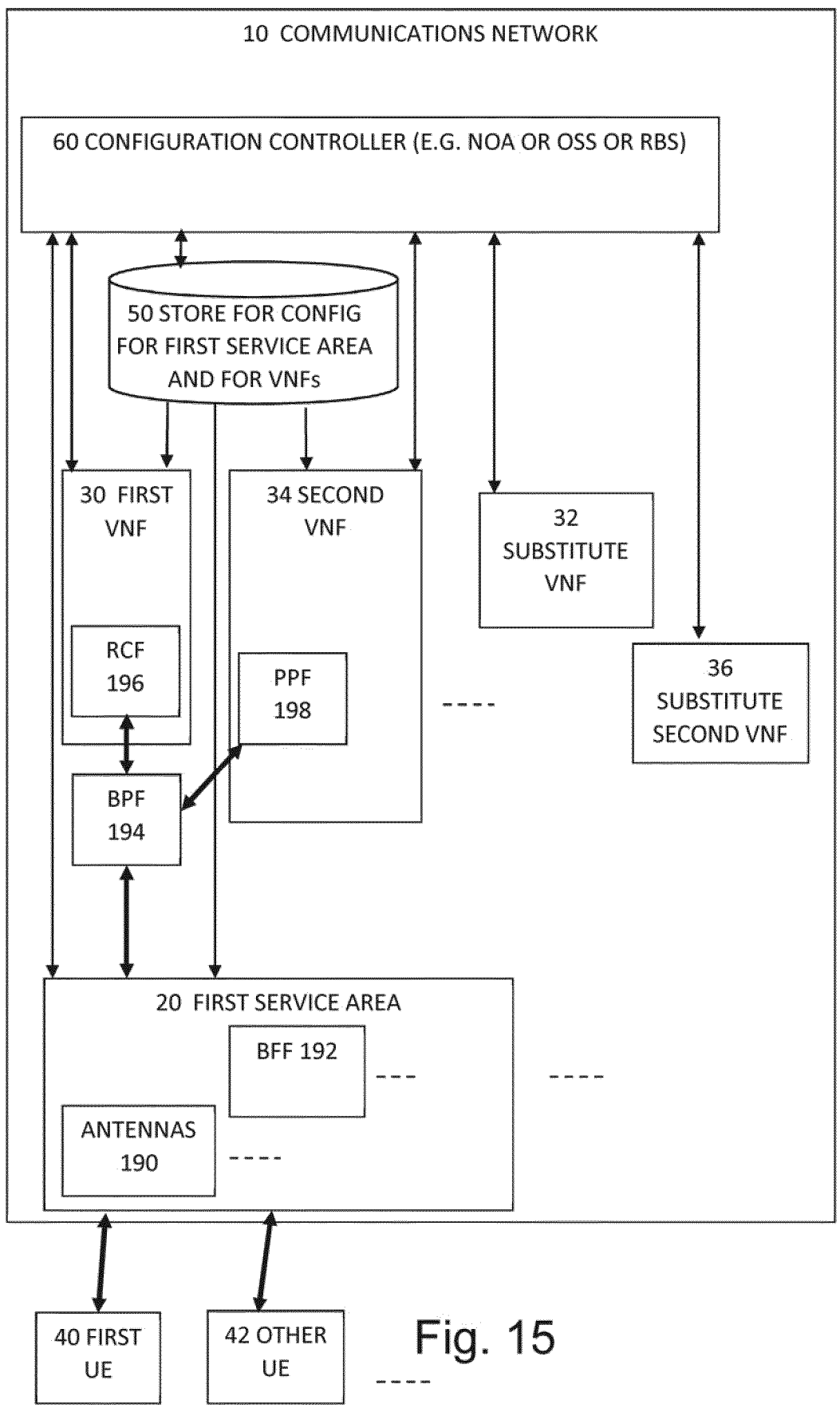
FIG. 15 shows an example showing VNFs for RAN virtualization.

FIG. 15, Example Showing VNFs for RAN Virtualization

FIG. 15 shows a schematic view similar to that of FIG. 1 and corresponding reference signs have been used as appropriate. Compared to FIG. 1, in this FIG. 15, there are two VNFs shown, 30, 34, and two corresponding substitute VNFs, 32, 36. There may be many more such VNFs or the functions shown may be spread across many VNFs. The contents of the first VNF 30 are shown as RCF 196 (Radio Control Functions), such as load sharing among system areas and different radio technologies, as well as the use of policies to control the schedulers in the BPFs and PPFs. At the user and bearer level, the RCF can negotiate QoS and other policies with other domains, and is responsible for the associated service level agreement (SLA) enforcement in the network. The RCF controls the overall RAN performance relative to the service requirement, creates and manages analytics data, and is responsible for the RAN SON functions. The contents of the second VNF 34 is shown as PPF 198, (Packet Processing Functions) which can contain user-plane functions, and include a PDCP layer (Packet Data Convergence Protocol)—such as encryption—and any multipath handling function for dual connectivity anchor point and data scheduling.

The PPF and the RCF are shown as receiving a traffic flow from a BPF 194, (Base Processing Functions), which can include for example RLC (Radio Link Control) and MAC (Medium Access Control) functions. The BPF 194 is shown as receiving a traffic flow from the first service area 20, which is shown as containing antennas 190 and Beam Forming Functions BFF 192.

In operation, the lower layer processing is handled by the service area, and BPF, and the higher layer processing is handled by the VNFs. If a change in configuration such as radio power, or PCI, or radio frequencies is proposed, the RCF which deals with scheduling of signals to and from multiple UEs, could be impacted for example if it is in use, since PCI is critical to the interaction with the UEs and so critical to maintaining the operation of the scheduling. Hence the RCF might need to reset its scheduling if the PCI is changed, so this change should be made when the VNF is not in use. If the radio power or frequencies are changed, then the BPF or BFF at least may need to be reset. So, the configuration change with respect to these types of functions should be carried out when the respective VNFs are not in use, so that these functions can adjust their state or reset if needed, without the risk of losing communication with the UE or other negative impact on the services provided to the UEs.

Figure 16:
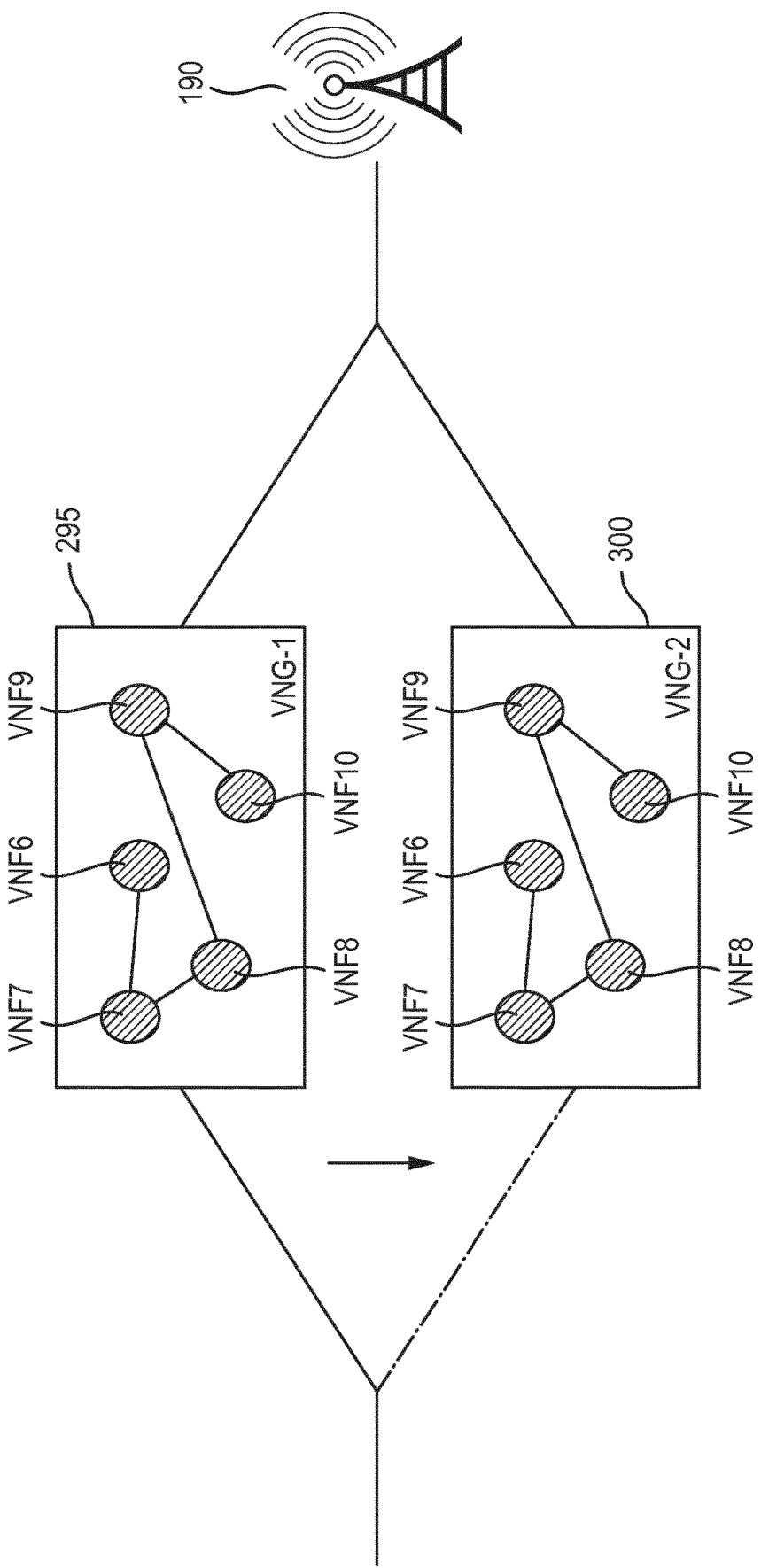
FIG. 16 shows an example showing a substitute VNG.

FIG. 16 Example Showing Substitute VNF Forwarding Graph

FIG. 16 shows a first VNG, VNG-1, and a substitute VNG, VNG-2, which is a replicated version of VNG-1, provided for the purpose of managing the change of configuration as described above. Each of these VNGs has the same sequence of VNFs used to process the user traffic and provide the communications service. These VNFs are labelled VNF6 to VNF10, but there may be many more and there may be more complex paths between them than a simple linear sequence shown. The process of transferring between VNG-1 and VNG-2 (indicated by an arrow in FIG. 16) so as to carry out the configuration change while maintaining the service, can be carried out in the ways described above in general terms in relation to FIGS. 4 and 5, or in other ways.

In a first method corresponding to FIG. 4, the instantiation step involves VNG-1 being replicated to create the new instance VNG-2. VNG-2 will have the identical configuration as VNG-1 except that the UE's attached to VNG-1 are moved to VNG-2 via the hand-over procedure. The parameter configurations of VNG-2 mostly stay the same as VNG-1 except the parameter to be changed, such as PCI (physical cell identifier), which is changed to the desired new value before the hand-over (note this parameter plays a crucial role in the handover procedure and so should not be changed while a UE is attached). After all UE's are detached from VNG-1, the VNG-1 can be destroyed. From the UE's point of view the whole procedure is no more than a simple hand-over, and so there is unlikely to be disruption to service.

In the alternative method corresponding to FIG. 5, the VNG-1 is replicated and the new instance is VNG 2. VNG 2 will have the identical configuration as VNG 1. The traffic flow is steered to and handled by VNG 2. The UEs are moved to VNG 2 but are unaware of this move as VNG 2 is identical to VNG 1. Both the CI and PCI are unchanged. VNG 1 is then updated with new and changed parameters. After the configuration parameters used in VNG 1 are changed as required, the UEs are moved back to VNG 1 with a hand-over procedure, i.e. the CI (Cell Identity) can be unchanged however the PCI will change as the RRC procedure with UE is carried out. Again, from the UE's viewpoint the whole procedure is not more than a hand-over.

Figure 17:
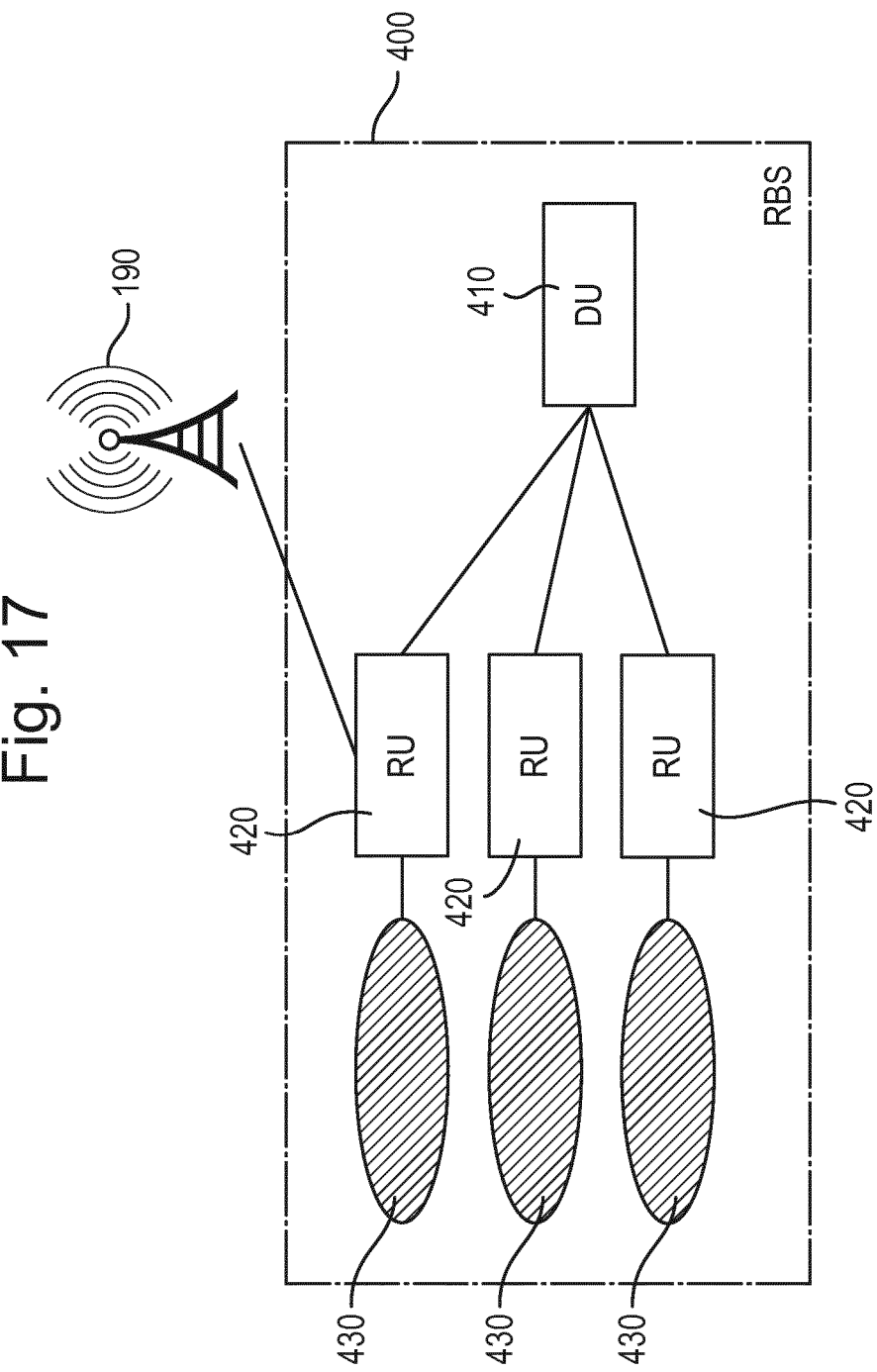
FIG. 17 shows an example showing an RBS.

FIG. 17, Example Using RBS

The implementation of the control of this configuration change can be done as shown in FIG. 10 or 11, or can be implemented in an RBS running on its own HW or in a data centre where the RBS SW runs on data centre HW. To enable replication, the RBS SW components should be partially or completely virtualized and the SW can run either within the same system if the RBS is a physical node (i.e. in control of its own HW resources or within a data centre, i.e. the RBS SW is running on virtualized HW (i.e. limited control over its own HW resources).

In the example shown in FIG. 17, the RBS 400 has a data unit DU 410, coupled to radio units RU 420 each of which has an antenna 190 forming a service area or cell 430 using for example a EUTRAN (Evolved Universal Mobile Telecommunications System Terrestrial Radio Access Network) standard for example. The RBS will have a connection with an OSS (not shown). The DU can be used to multiplex/demultiplex traffic and couple it to or from the rest of the network. An example of how the interaction of the RBS with the OSS can be realized will now be described.

OSS-RBS Interaction for Configuration Changes:

In a conventional procedure, an OSS generates a proposed configuration change, for example in the form of a list of parameter changes. These configuration parameters are pushed from an OSS toward the RBS, and then the configuration changes are implemented in the RBS during a pre-planned maintenance window. In contrast, according to embodiments of the invention as described, after the OSS generates a proposed configuration change, for example in the form of a list of parameter changes, the OSS initiates a process with the RBS of allocating additional physical network resources if these are needed during the configuration change. This may optionally include starting mitigation measures as described above, if there are limited physical network resources available. Then, before pushing the configuration parameters to the RBS, the OSS or any Orchestrator requests the RBS to instantiate the substitute VNFs and substitute service area, for example by spinning up a new instance of the RBS SW including the configuration and VNG. Then, after the configuration change has been implemented, the OSS may instruct the RBS to destroy the first or the substitute VNF, whichever is no longer needed.

Examples of Radio Power Output or Bandwidth as a Configuration to be Changed:

A change in radio power output might be useful to save power consumption or to increase coverage area for example to match capacity to demand. Conventionally it requires a restart of an RBS to bring in new power setting. This change in power could cause interference or cause UEs to lose connection, and thus it is a parameter which can negatively impact VNFs in use providing a service to UEs, and yet it can be useful to change the power any time, not just at downtimes. Hence there is benefit in carrying out the change in configuration for this parameter according to the embodiments described above. Similar considerations apply to a change in bandwidth, for example from 5 MHz to 10 MHz or vice-versa. In case of 5G it is more likely to be more bandwidth, say 50 MHz to 100 MHz, or a change in band, say from 700 MHz band to 2100 AWS (Advanced Wireless Services) band. Again, there is benefit in carrying out the change in configuration for this parameter according to the embodiments described above. Other examples of parameters can be envisaged.

Figure 18:
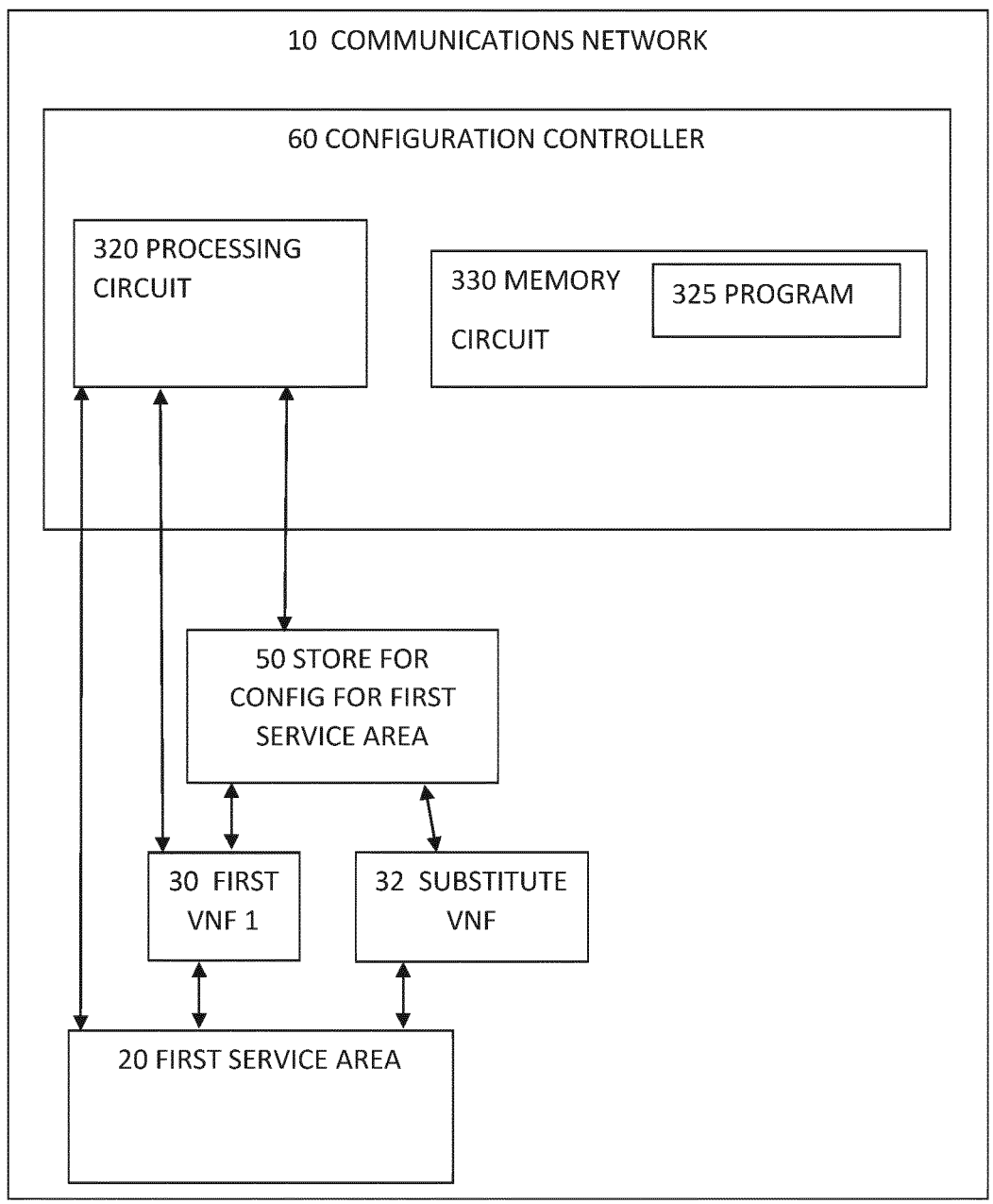
FIGS. 18 and 19 show examples of configuration controller implementations.
Figure 19:
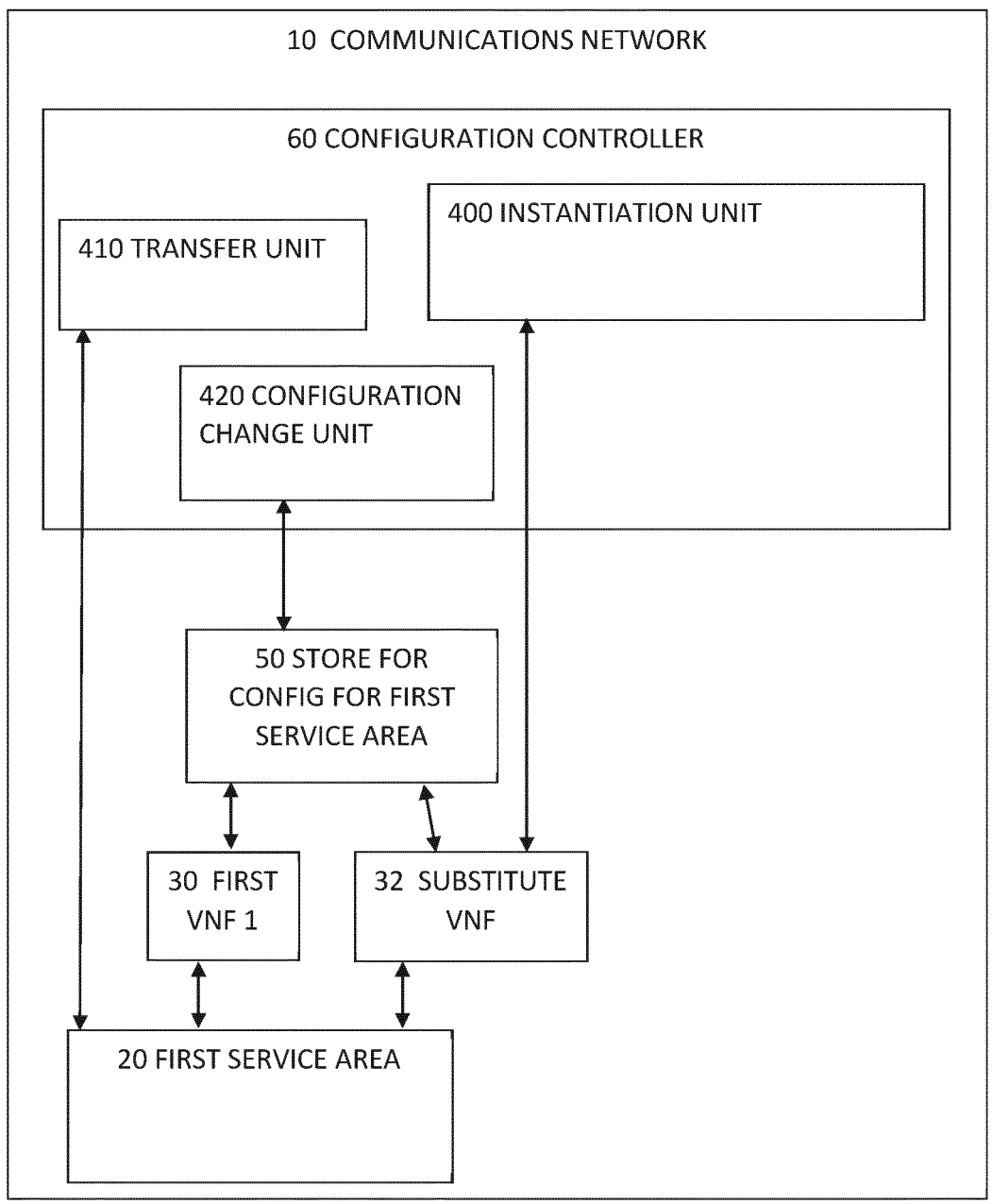

FIGS. 18, 19 Examples of Configuration Controller Implementations

FIG. 18 shows a schematic view similar to that of FIG. 1, and corresponding reference signs have been used. It shows an example of features of the configuration controller, 60. Any electrical domain circuitry can in principle be implemented by a processing circuit running a program. FIG. 18 shows an example of the configuration controller, 60, including a processing circuit 320, coupled to a storage medium in the form of a memory circuit 330 having a stored program 325. Hence this is an example of computer program for encoding a signal for optical transmission, the computer program comprising computer code which, when run on processing circuitry of an encoding apparatus, causes the encoding apparatus to carry out any of the method steps described above for controlling the change in configuration. It is also an example of a computer program product comprising a computer program and a computer readable storage medium on which the computer program is stored. The storage may also comprise persistent storage, which, for example, can be any single one or combination of magnetic memory, optical memory, solid state memory or even remotely mounted memory.

In one embodiment the configuration controller, 60, is for making changes to configuration of a first service area, 20, of a communications network, 10. The communications network, 10, comprises a number of service areas capable of providing at least one service to at least one UE, 40, 42. The network also comprise a plurality of VNFs, 30, 32, used in providing the services to the UEs according to the configuration. The configuration controller comprises a processing circuit, 320, and a memory circuit, 330, the memory circuit containing instructions, 325, executable by the processing circuit such that the apparatus is operative to instantiate at least one substitute VNF, 32, corresponding to the first VNF, 30, in the case of a proposed change to the configuration of the first service area which could negatively impact at least one service provided to a first of the UEs, 40, using a first of the VNFs, 30, if the change is made while the first VNF, 30, is in use. The configuration controller, 60, is also operative to transfer the first UE, 40, to use the substitute VNF, 32, instead of using the first VNF, 30, and make the proposed change to the configuration with respect to one of these VNFs, the first VNF or the substitute VNF, 32, while the service to the first UE is maintained using the other of these VNFs.

In one embodiment the configuration controller, 60, is also operative to implement the proposed change in the configuration with respect to the substitute VNF before, 122, the transfer, 110, of the first UE to use the substitute VNF.

Preferably, the configuration controller, 60, is operative to implement the proposed change in the configuration with respect to the first VNF, 32, after the transfer of the first UE, 40, to use the substitute VNF, 32, and subsequently to transfer back the first UE, 40, to use the first VNF instead of using the substitute VNF.

Preferably, the configuration controller, 60, is also configured such that in the process of instantiation it is operative to provide a substitute service area at least partially corresponding to the first service area, and the transfer comprises a hand-over of the first UE, 40, to the substitute service area.

Preferably, the configuration controller, 60, is also operative to provide the substitute service area with a configuration and relations to other parts of the network corresponding to those of the first service area.

Preferably, if the first VNF, 30, is a part of a first Virtual Network function Group, VNG-1, of all the VNFs modelled by a VNF forwarding graph defining the service to the first UE, the configuration controller is also configured such that the instantiating comprises instantiating a substitute VNG, VNG-2, corresponding to the first VNG, VNG-1.

Preferably, the configuration controller, 60, is also operative to identify which of the VNFs used to provide the service to the first UE, 40, are affected by the proposed change in configuration, and to select which VNFs to substitute based on those identified as being affected.

Preferably, when the first VNF, 30, comprises virtualised parts and physical network resources, 80, and the configuration controller, 60, is also configured such that the instantiating of the substitute VNF comprises allocating physical network resources for use by the substitute VNF.

Preferably, the configuration controller, 60, is also operative to determine prior to the allocating, if there is sufficient capacity to allocate the physical network resources for use by the substitute VNF without affecting other UEs. The is further operative to, if there is not sufficient capacity, carry out load balancing between the first service area and other service areas of the communications network to make more capacity available. If the capacity is insufficient the configuration controller, 60, is further operative to reduce capacity allocated to other UEs, to provide more capacity for the substitute VNF. Alternatively, if there is not sufficient capacity, the configuration controller, 60, is operative to carry out load balancing between different access network technologies to make more capacity available.

Preferably, the configuration controller, 60, also being operative to take into account inter service area interference when allocating physical network resources for use by the substitute VNF if the network comprises a radio access network.

In the example of FIG. 19, there is a schematic view similar to that of FIG. 1, and again corresponding reference signs have been used.

FIG. 19 illustrates alternative embodiment of a configuration controller, 60, for making changes to configuration of a first service area, 20, of a communications network, 10. The communications network, 10, comprises a number of service areas capable of providing at least one service to at least one UE, 40, 42. The network also comprise a plurality of VNFs, 30, 32, used in providing the services to the UEs according to the configuration. The configuration controller, 60, comprises an instantiation unit, 400, for instantiating at least one substitute VNF, 32, corresponding to the first VNF, 30, in the case of a proposed change to the configuration of the first service area which could negatively impact at least one service provided to a first of the UEs, 40, using a first of the VNFs, 30, if the change is made while the first VNF, 30, is in use. The configuration controller, 60, also comprises a transfer unit, 410, for transferring the first UE, 40, to use the substitute VNF instead of using the first VNF, and further comprises a configuration change unit, 420, for making the proposed change to the configuration with respect to one of these VNFs, the first VNF or the substitute VNF, while the service to the first UE is maintained using the other of these VNFs.

FIG. 19 shows an example of features of the configuration controller, 60, in which the instantiation unit 400 is for carrying out the instantiation as described above in relation to FIGS. 3 to 9 for example, the transfer unit 410 is provided for carrying out the transfer as described above with reference to FIGS. 3 to 9, and the configuration change unit 420 is provided for carrying out the change in configuration as described above in relation to FIGS. 3 to 9.

Other variations can be envisaged within the claims.

The invention claimed is:

1. A method of making changes to configuration of a first service area of a communications network having a number of service areas capable of providing at least one service to at least one UE, User Equipment, the network having a plurality of VNFs, Virtual Network Functions, used in providing the services to the UEs according to the configuration, and the method having steps of:
in the case of a proposed change to the configuration of the first service area which could negatively impact at least one service provided to a first of the UEs using a first of the VNFs, if the change is made while the first VNF is in use, instantiating at least one substitute VNF corresponding to the first VNF, wherein instantiating at least one substitute VNF corresponding to the first VNF comprises:
determining whether there is enough capacity to allocate a first set of physical network resources from a first access technology to the first VNF, and
in response to determining that there is not enough capacity to allocate the first set of physical network resources from the first access technology to the first VNF, allocating a second set of physical network resources from a second access technology that has enough capacity to allocate the second set of physical network resources to the first VNF;
transferring the first UE to use the substitute VNF instead of using the first VNF, and making the proposed change to the configuration with respect to one of these VNFs, the first VNF or the substitute VNF, while the service to the first UE is maintained using the other of these VNFs.

2. The method of claim 1, having a step of implementing the proposed change in the configuration with respect to the substitute VNF before the transfer of the first UE to use the substitute VNF.

3. The method of claim 1, having a step of implementing the proposed change in the configuration with respect to the first VNF after the transfer of the first UE to use the substitute VNF, and subsequently transferring back the first UE to use the first VNF instead of using the substitute VNF.

4. The method of claim 1, and the step of instantiating also comprises providing a substitute service area at least partially corresponding to the first service area, and the step of transferring also comprises a hand-over of the first UE to the substitute service area.

5. The method of claim 4, the step of providing the substitute service area comprises providing the substitute service area with a configuration and relations to other parts of the network corresponding to those of the first service area.

6. The method of claim 4, where the first VNF is a part of a first Virtual Network function Group, VNG, of all the VNFs modelled by a VNF forwarding graph defining the service to the first UE, the step of instantiating comprising instantiating a complete substitute VNG corresponding to the first VNG.

7. The method of claim 1 and having steps of identifying which of the VNFs used to provide the service to the first UE are affected by the proposed change in configuration, and selecting which VNFs to substitute based on those identified as being affected.

8. The method of claim 1, the first VNF comprising virtualised parts and physical network resources, and the step of instantiating the substitute VNF comprising allocating physical network resources for use by the substitute VNF.

9. The method of claim 8 and having a prior step of determining if there is sufficient capacity to allocate the physical network resources for use by the substitute VNF without affecting other UEs.

10. The method of claim 9, and wherein if the capacity is insufficient, having a step of reducing capacity allocated to other UEs, to provide more capacity for the substitute VNF.

11. A computer program having instructions that when executed by processing circuitry cause the processing circuitry to carry out the method of claim 1.

12. A computer program product comprising a computer readable medium having stored on it the computer program of claim 11.

13. A configuration controller for making changes to configuration of a first service area of a communications network having a number of service areas capable of providing at least one service to at least one UE, User Equipment, the network having a plurality of VNFs, Virtual Network Functions used in providing the services to the UEs according to the configuration, and the configuration controller comprising a processing circuit and a memory circuit, the memory circuit containing instructions executable by the processing circuit such that the apparatus is operative to:
in the case of a proposed change to the configuration of the first service area which could negatively impact at least one service provided to a first of the UEs using a first of the VNFs, if the change is made while the first VNF is in use, instantiate at least one substitute VNF corresponding to the first VNF, wherein the memory circuit further contains instructions executable by the processing circuit such that the apparatus is operative to:
determine whether there is enough capacity to allocate a first set of physical network resources from a first access technology to the first VNF, and
in response to determining that there is not enough capacity to allocate the first set of physical network resources from the first access technology to the first VNF, allocate a second set of physical network resources from a second access technology that has enough capacity to allocate the second set of physical network resources to the first VNF;
transfer the first UE to use the substitute VNF instead of using the first VNF, and make the proposed change to the configuration with respect to one of these VNFs, the first VNF or the substitute VNF, while the service to the first UE is maintained using the other of these VNFs.

14. The configuration controller of claim 13 operative to implement the proposed change in the configuration with respect to the substitute VNF before the transfer of the first UE to use the substitute VNF.

15. The configuration controller of claim 13 operative to implement the proposed change in the configuration with respect to the first VNF after the transfer of the first UE to use the substitute VNF, and subsequently to transfer back the first UE to use the first VNF instead of using the substitute VNF.

16. The configuration controller of claim 13 also being configured such that in the instantiation process the configuration controller is operative to provide a substitute service area at least partially corresponding to the first service area, and the transfer comprises a hand-over of the first UE to the substitute service area.

17. The configuration controller of claim 16, where the first VNF is a part of a first Virtual Network function Group, VNG, of all the VNFs modelled by a VNF forwarding graph defining the service to the first UE, also being configured such that the instantiating comprises instantiating a substitute VNG corresponding to the first VNG.

18. The configuration controller of claim 13 operative to identify which of the VNFs used to provide the service to the first UE are affected by the proposed change in configuration, and to select which VNFs to substitute based on those identified as being affected.

19. The configuration controller of claim 13, the first VNF comprising virtualised parts and physical network resources, and the configuration controller also being configured such that the instantiating of the substitute VNF comprises allocating physical network resources for use by the substitute VNF.

20. The configuration controller of claim 19 operative to determine prior to the allocating, if there is sufficient capacity to allocate the physical network resources for use by the substitute VNF without affecting other UEs.

21. The configuration controller of claim 20 operative to, if the capacity is insufficient, reduce capacity allocated to other UEs, to provide more capacity for the substitute VNF.

22. The configuration controller of claim 20 operative to, if there is not sufficient capacity, carry out load balancing between different access network technologies to make more capacity available.

* * * * *